(12) United States Patent
Seto

(10) Patent No.: US 7,622,521 B2
(45) Date of Patent: Nov. 24, 2009

(54) COLORED CURABLE COMPOSITION, COLOR FILTER AND METHOD OF PRODUCING THEREOF

(75) Inventor: Nobuo Seto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 428 days.

(21) Appl. No.: 11/599,403

(22) Filed: Nov. 15, 2006

(65) Prior Publication Data

US 2007/0112134 A1   May 17, 2007

(30) Foreign Application Priority Data

Nov. 15, 2005 (JP) .............................. 2005-330668

(51) Int. Cl.
  *C08K 5/3492* (2006.01)
  *C08K 5/34* (2006.01)
(52) U.S. Cl. ......................................... 524/100; 524/94
(58) Field of Classification Search ................... 524/100
  See application file for complete search history.

(56) References Cited

U.S. PATENT DOCUMENTS

2005/0175908 A1 * 8/2005 Seto et al. ...................... 430/7

FOREIGN PATENT DOCUMENTS

| JP | 2005-213357 A | 8/2005 |
| JP | 2005-215286 A | 8/2005 |

OTHER PUBLICATIONS

STIC search results.*

* cited by examiner

*Primary Examiner*—Ling-Siu Choi
*Assistant Examiner*—Hui Chin

(74) *Attorney, Agent, or Firm*—Sughrue Mion, PLLC

(57) ABSTRACT

A colored curable composition including a polymer dye in which the polymer dye is one or more members selected from the group consisting of a copolymer of at least one of a dye monomer represented by the following formula (P) and a colorless monomer having at least one ethylenic double bond, and a polymer derived from the dye monomer represented by the following formula (P). In formula (P): $R^{a1}$, $R^{a2}$ are H, an aliphatic group, an aryl group, or a heterocyclic group; $L^1$ is represented by (L-1) to (L-4); i=0 or 1; Q is represented by formula (1), wherein: $R^{a3}$, $R^{a4}$ are H, an aliphatic group, an aryl group, or a heterocyclic group; $R^1$ is an aliphatic group, aryl group, heterocyclic group, acyl group, or an aliphatic oxycarbonyl group; $R^2$ is H or a substituent; $X^1$ is $-CR^3=$, or $N(R^3$ is H, or a substituent); and A is a coupler residue.

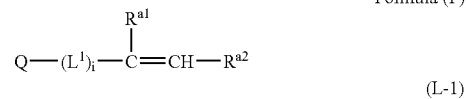

Formula (P)

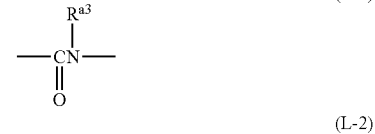

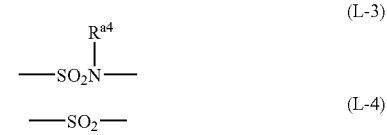

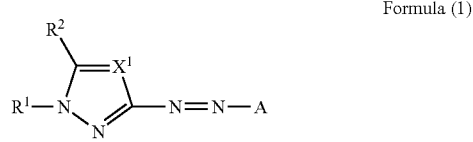

Formula (1)

18 Claims, No Drawings

COLORED CURABLE COMPOSITION, COLOR FILTER AND METHOD OF PRODUCING THEREOF

CROSS-REFERENCE TO RELATED APPLICATION

This application claims priority under 35 USC 119 from Japanese patent Application Nos. 2905-330668, the disclosures of which are incorporated by reference herein.

BACKGROUND OF THE INVENTION (i) Field of the Invention

The present invention relates to a colored curable composition constituting a color filter used for liquid crystal display elements (LCD) and solid state image pick-up elements (for example CCD, CMOS), as well as to a color filter using the colored curable composition and a process of preparing the color filter.

(ii) Description of the Related Art

As a color filter formed on a element for picking up a color image using a solid image pick-up element or for displaying a color image using a liquid crystal display element, a color filter comprising a yellow filter layer, a magenta filter layer, and a cyan filter layer formed in adjacent with each other on one identical support has been known. Further, a color filter comprising a red filter layer, a green filter layer, and a blue filter layer has been known. Then, in the filter layers described above, a stripe pattern or a mosaic-pattern is formed.

As a method of producing the color filter described above, various methods have been proposed. Among them, a so-called color resist method has been generally put to practical use. The color resist method includes a process of exposing a photosensitive resin composition containing a dye and developing is repeated a required number of times.

The color resist method is a method of using a radiation sensitive colored composition in which a pigment is dispersed in various photosensitive compositions and producing a color filter by photolithographic method. Since pigments are used in the method, the filter is stable to light, heat, or the like. Further, since patterning in this method is conducted by photolithographic method, registering accuracy is also sufficient and it is considered that the method is suitable for producing color filters for use in large screen color displays or high-definition color displays.

In the case of producing a color filter by the pigment dispersion process of dispersing a pigment, a radiation sensitive composition is coated on a glass support by using a spin coater, a roll coater, and the like. to form a coating film. Colored pixels are obtained by pattern-exposing and developing the coated film. Then, the color filter can be prepared by repeating this process a number of times corresponding to the desired number of color hues.

As the pigment dispersion process, a negative photosensitive composition in which a photopolymerizable monomer and a photopolymerization initiator are combined with alkali soluble resin is disclosed (e.g., see Japanese Patent Application Laid-Open (JP-A) Nos. 1-102469, 1-152499, 2-181704, 2-199403, 4-76062, 5-273411, 6-184482, 7-140654, 2002-14223, 7-72323).

Recently, a further high-definition has been desired for color filters for use in solid image pick-up elements. However, conventional pigment dispersion systems described above have difficulties in further improving the definition. Further, Because of problems such as generation of color irregularities due to coarse particles of the pigment, the systems are not suitable for the use which requires fine patterns such as solid state image pick-up elements. For solving such problems, the use of conventional dyes has been proposed (e.g., see Japanese Patent Application Laid-Open (JP-A) Nos. 6-75375, and 2002-14221). Further, a positive type photosensitive composition is also disclosed (e.g., see Japanese Patent No. 7-111485 and JP-A No. 2002-14223).

However, the dye-containing colored curable composition involves the following subjects for which further improvement has been demanded.

(1) Dyes are generally inferior to pigments in thermal resistance, light-fastness, and the like.

(2) In the case where the molar absorption coefficient of a dye is low, a large amount of the dye has to be added. Accordingly, it is necessary to reduce the relative amount of components such as a polymerizable compound, a binder, and a photopolymerization initiator, and that like in the colored curable composition. As a result, the thermal resistance and the solvent resistance in the cured portion when a subsequent layer is coated thereon are insufficient.

(3) Even in dyes having a high molar absorption coefficient of the dye, it is necessary to increase sufficiently the molecular weight in the case of the dyes having a low solubility in order to improve the solubility in liquid preparations or improvement for the stability of liquid preparations. As a result, a large amount (weight) of the dye has to be added. Accordingly, it is necessary to reduce the relative amount of other compounds such as a polymerizable compound, a binder and a photopolymerization initiator in the colored curable composition. Accordingly, the thermal resistance of the cured portion and the solvent resistance when the subsequent layer is coated thereon are insufficient.

Then, for improving the subjects described above, particularly, the subjects (2) and (3), while those having specified functional groups have been studied, but they are not sufficient (e.g., see Japanese Patent Application Laid-Open (JP-A) Nos. 7-72323).

On the other hand, it has been known in the color filter that a yellow dye and a magenta dye are used for a red filter array, a yellow dye and a cyan dye are used for a green filter array, and a long wavelength magenta dye and a cyan dye are used for a blue filter array (e.g., see Japanese Patent Application Laid-Open (JP-A) Nos. 2002-14221).

SUMMARY OF THE INVENTION

However, dyes which meet the requirements for the light-fastness and thermal resistance, have an excellent stability over time of the colored curable composition and meet the requirements for the solvent resistance have not yet been found. Accordingly, a further improvement has been demanded.

Further, in the application use such as solid image pick-up elements which particularly require a high definition and uniform color, a dye-containing colored curable composition is useful. However, it is necessary to improve the light-fastness, the thermal resistance, and stability over time in the form of liquid preparations of compositions. Further, in the case of using an organic solvent soluble dye, since the resistance of the colored pattern to an organic solvent is insufficient, it has been desired also for the improvement of the solvent resistance when a subsequent color pattern is superposedly coated on a pattern that has already formed such that the dye in the colored pattern is not eluted therefrom.

The present invention has been achieved in view of the foregoing situations and provides a colored curable composition which have a good color hue and high light-transmittance characteristic; a high light-fastness and thermal resistance; an excellent in the stability over time; and an excellent solvent resistance. Further, the invention provides a color filter having a good color hue, a high transmittance characteristic, an excellent light-fastness and thermal resistance, and a method of producing thereof.

Based on the following knowledge obtained by earnest studies made by the present inventors, the invention has been achieved. That is, it has been found that a high light-fastness and a thermal resistance, and an excellent stability over time can be obtained, and the solvent resistance is improved by using a specified polymer as a polymer dye.

A first aspect of the invention provides, a colored curable composition comprising a polymer dye in which the polymer dye is one or more members selected from the group consisting of a copolymer including at least one of a dye monomer represented by formula (P) and a colorless monomer having at least one ethylenic double bond, and a polymer derived from the dye monomer represented by formula (P).

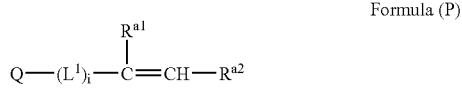
Formula (P)

wherein in formula (P): $R^{a1}$ and $R^{a2}$ each independently represents a hydrogen atom, an aliphatic group, an aryl group, or a heterocyclic group; $L^1$ represents any one of the following (L-1), (L-2), (L-3), or (L-4); i represents 0 or 1; and Q represents a dye residue obtained by removing a hydrogen atom from an arbitrary one of possible position(s) on a dye represented by formula (1),

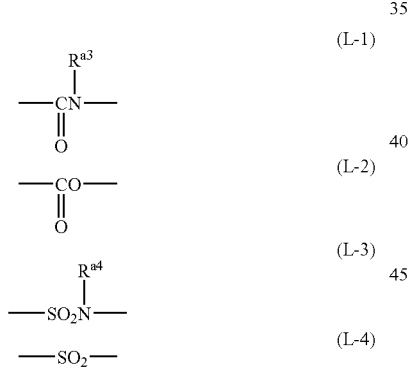

wherein in (L-1) to (L-4): $R^{a3}$ and $R^{a4}$ each independently represents a hydrogen atom, an aliphatic group, an aryl group, or a heterocyclic group; and the dye residue and the group having an ethylenic double bond may be bonded to either side of (L-1) to (L-4),

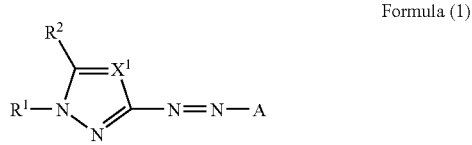
Formula (1)

and wherein in formula (1): $R^1$ represents an aliphatic group, an aryl group, a heterocyclic group, an acyl group, an aliphatic oxycarbonyl group, an aryloxycarbonyl group, a carbamoyl group, an aliphatic sulfonyl group, an arylsulfonyl group, or a sulfamoyl group; $R^2$ represents a hydrogen atom or a substituent; $X^1$ represents —$CR^3$= or a nitrogen atom; $R^3$ represents a hydrogen atom or a substituent; A represents a coupler residue; and when $X^1$ represents —$CR^3$=, $R^1$ and $R^2$ and/or $R^2$ and $R^3$ may join to each other to form a 5- to 7-membered ring.

A second aspect of the invention provides, a color filter comprising a polymer dye in which the polymer dye is one or more members selected from the group consisting of a copolymer including at least one dye monomer represented by formula (P) and a colorless monomer having at least one ethylenic double bond, and a polymer derived from the dye monomer represented by formula (P).

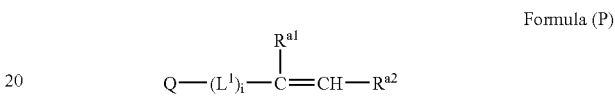
Formula (P)

wherein in formula (P): $R^{a1}$ and $R^{a2}$ each independently represents a hydrogen atom, an aliphatic group, an aryl group, or a heterocyclic group; $L^1$ represents any one of the following (L-1), (L-2), (L-3), or (L-4); i represents 0 or 1; and Q represents a dye residue obtained by removing a hydrogen atom from an arbitrary one of possible position(s) on a dye represented by formula (1),

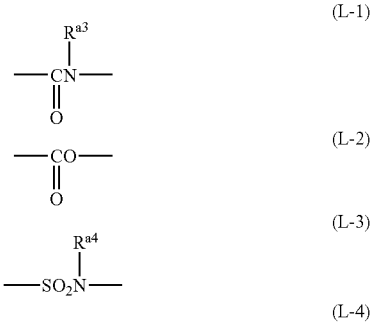

wherein in (L-1) to (L-4): $R^{a3}$ and $R^{a4}$ each independently represents a hydrogen atom, an aliphatic group, an aryl group, or a heterocyclic group; and the dye residue and the group having an ethylenic double bond may be bonded to either side of (L-1) to (L-4),

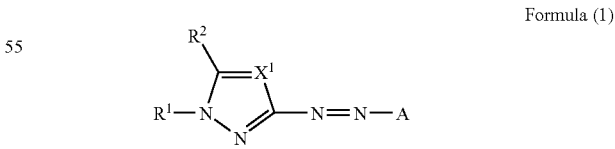
Formula (1)

and wherein in formula (1): $R^1$ represents an aliphatic group, an aryl group, a heterocyclic group, an acyl group, an aliphatic oxycarbonyl group, an aryloxy carbonyl group, a carbamoyl group, an aliphatic sulfonyl group, an arylsulfonyl group, or a sulfamoyl group; $R^2$ represents a hydrogen atom or a substituent; $X^1$ represents —$CR^3$= or a nitrogen atom; $R^3$ represents a hydrogen atom or a substituent; A represents a coupler residue; and when $X^1$ represents $—CR^3=$, $R^1$ and $R^2$ and/or $R^2$ and $R^3$ may join to each other to form a 5- to 7-membered ring.

A third aspect of the invention provides, a method of producing a color filter comprising: coating the colored curable composition according to the first aspect onto a support; then exposing through a mask; and developing to form a pattern image.

DETAILED DESCRIPTION OF THE INVENTION

Hereinbelow, the colored curable composition, the color filter and the method of producing thereof of the invention will be described in detail.

<Colored Curable Composition>

The colored curable composition of the invention contains a polymer dye. The polymer dye has a feature in comprising a copolymer including at least one of a dye monomer represented by formula (P) and a colorless monomer having at least one ethylenic double bond, or a polymer derived from the dye monomer represented by the following formula (P) (referred to as "dye according to the invention").

The colored curable composition of the invention may be any composition so long as it is cured by light or heat and preferably contains a radiation sensitive compound and a polymerizable monomer. Further, the colored curable composition of the invention can be generally constituted by using a solvent. The colored curable composition of the invention can be constituted, arbitrarily with other ingredients such as a binder and a cross-linking agent.

Further, in the invention, a resist solution has the same meaning as the curable composition.

[Aliphatic, Aryl, Hetero-Ring in the Invention]

In the invention, the aliphatic group may be straight chained, branched, or cyclic, and saturated or unsaturated in the aliphatic portion thereof. The aliphatic group includes, for example, an alkyl group, an alkenyl group, a cycloalkyl group, and a cycloalkenyl group, which may be unsubstituted or may be substituted by a substituent. Further, aryl in the present specification may be either a mono-ring or condensed ring and may be unsubstituted or substituted by a substituent. Further, the hetero-ring in the present specification has a hetero atom (for example, a nitrogen atom, sulfur atom, or oxygen atom) in the hetero-ring portion. Hetero-ring may be either a saturated ring or unsaturated ring. The hetero-ring may be a single-ring or condensed ring. The hetero-ring may be unsubstituted or substituted by a substituent.

[Substituent in the Invention]

In the invention, substituent may be any group capable of substitution. The substituent includes, for example, an aliphatic group, an aryl group, a heterocyclic group, an acyl group, an imide group, an azo group, an acyloxy group, an acylamino group, an aliphaticoxy group, an aryloxy group, a heterocyclicoxy group, an aliphaticoxy carbonyl group, an aryloxycarbonyl group, a heterocyclicoxy carbonyl group, a carbamoyl group, an aliphatic sulfonyl group, an aryl sulfonyl group, a heterocyclic sulfonyl group, an aliphatic sulfonyloxy group, an arylsulfonyloxy group, a heterocyclic sulfonyloxy group, a sulfamoyl group, an aliphatic sulfone amide group, an aryl sulfone amide group, a heterocyclic sulfone amide group, an amino group, an aliphatic amino group, an arylamino group, a heteocyclic amino group, an aliphatic oxycarbonyl amino group, an aryl oxycarbonyl amino group, a heterocyclic oxycarbonyl amino group, an aliphatic sulfinyl group, an arylsulfinyl group, an aliphaticthio group, an arylthio group, a heterocyclicthio group, a hydroxyl group, a cyano group, a sulfo group, a carboxyl group, an aliphaticoxy amino group, an aryloxy amino group, a carbamoyl amino group, a sulfamoyl amino group, a halogen atom, a sulfamoyl carbamoyl group, a carbamoyl sulfamoyl group, a dialipahticoxy phosphinyl group, and a diaryloxy phosphinyl group, and that like.

[Dye Monomer Represented by Formula (P)]

The dye monomer represented by the formula (P) of the invention will be described specifically below.

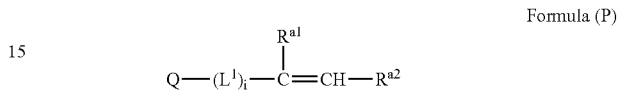

Formula (P)

In the formula (P), $R^{a1}$ and $R^{a2}$ each independently represents a hydrogen atom, an aliphatic group, an aryl group, or a heterocyclic group; $L^1$ represents any one of the following (L-1), (L-2), (L-3), or (L-4); i represents 0 or 1; and Q represents a dye residue obtained by removing a hydrogen atom from an arbitrary one of possible position(s) on a dye represented by formula (1).

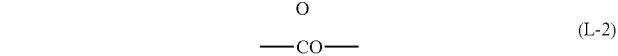

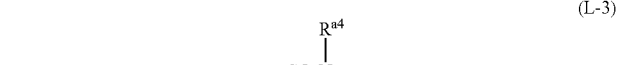

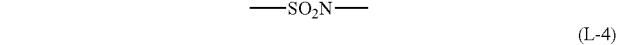

In (L-1) to (L-4), $R^{a3}$ and $R^{a4}$ each independently represents a hydrogen atom, an aliphatic group, an aryl group, or a heterocyclic group. The dye residue and the group having an ethylenic double bond may be bonded to either side in (L-1) to (L-4).

The aliphatic group represented by $R^{a1}$ or $R^{a2}$, and the aliphatic group represented by $R^{a3}$ or $R^{a4}$ in $L^1$ may be straight-chained, branched or cyclic, and may be a saturated group or unsaturated group. Further, they may be unsubstituted or have a substituent. The aliphatic group is, preferably, an aliphatic group having from 1 to 15 carbon atoms in total and an alkyl group is more preferred. Examples thereof include a methyl group, an ethyl group, an isopropyl group, a 2-ethylhexyl group, an aryl group, a cyclohexyl group, and a 2-cyclohexenyl group, and that like.

The aryl group represented by $R^{a1}$ and $R^{a2}$, and the aryl group represented by $R^{a3}$ or $R^{a4}$ in $L^1$ may be unsubstituted or have a substituent and an aryl group having 6 to 16 carbon atoms in total is preferred. Examples thereof include phenyl group, 2-chlorophenyl group, 4-methylphenyl group, and 4-methoxyphenyl group.

The heterocyclic group represented by $R^{a1}$ or $R^{a2}$, and the heterocyclic group represented by $R^{a3}$ or $R^{a4}$ in $L^1$ may be unsubstituted or have a substituent. They may be a saturated ring group or unsaturated ring group and preferably have from 3 to 15 carbon atoms in total. Examples thereof include 3-pyridyl group, 2-pyrimidyl group, 2-pyradinyl group, and 1-piperidyl group.

Among them, with a view point of more effectively providing the effect of the invention, each of $R^{a1}$ and $R^{a2}$ is preferably a hydrogen atom, an alkyl group or an aryl group, more preferably, the hydrogen atom or alkyl group and, most preferably, the hydrogen atom.

With a view point of more effectively providing the effect of the invention, each of $R^{a3}$ and $R^{a4}$ is, preferably, a hydrogen atom, an alkyl group or an aryl group and, more preferably, the hydrogen atom or an alkyl group.

With a view point of more effectively providing the effect of the invention, i is preferably 1, $L^1$ is preferably (L-1) or (L-2) and more preferably (L-2). in the formula (P), A compound in which $R^{a1}$ is a hydrogen atom or an alkyl group, $R^{a2}$ is a hydrogen atom or an alkyl group, $L^1$ is (L-1), or (L-2), and Q is represented by the formula (1) is preferred. A compound in which $R^{a1}$ is a hydrogen atom or alkyl group, $R^{a2}$ is a hydrogen group, $L^1$ is (L-1) or (L-2), and Q is represented by the formula (1) is more preferred. A compound in which $R^{a1}$ is a hydrogen atom, $R^{a2}$ is a hydrogen atom, $L^1$ is (L-1) or (L-2), and Q is represented by the formula (1) is further preferred. A compound in which $R^{a1}$ is hydrogen atom, $R^{a2}$ is a hydrogen atom, $L^1$ is (L-1), and Q is represented by the formula (1) is particularly preferred.

Then, the formula (1) will be described specifically.

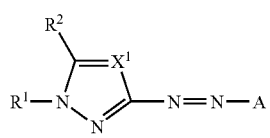

Formula (1)

In the formula (1), $R^1$ represents an aliphatic group, an aryl group, a heterocyclic group, an acyl group, an aliphatic oxycarbonyl group, an aryloxycarbonyl group, a carbamoyl group, an aliphatic sulfonyl group, an arylsulfonyl group, or a sulfamoyl group; $R^2$ represents a hydrogen atom or a substituent; $X^1$ represents —$CR^3$═ or a nitrogen atom; $R^3$ represents a hydrogen atom or a substituent; A represents a coupler residue; and when $X^1$ represents —$CR^3$═, $R^1$ and $R^2$ and/or $R^2$ and $R^3$ may join to each other to form a 5- to 7-membered ring.

The aliphatic group represented by $R^1$ may be unsubstituted or have a substituent. This may be straight-chained, branched, or cyclic and may be saturated or unsaturated. The aliphatic group which is group having 1 to 15 carbon atoms in total is preferred. Examples thereof include a methyl group, an ethyl group, a vinyl group, an allyl group, an ethynyl group, an isopropenyl group, a 2-ethylhexyl group and a cyclohexyl group.

The aryl group represented by $R^1$ may be unsubstituted or have a substituent and preferably has 6 to 16 carbon atoms in total. Examples thereof include phenyl group, 4-nitrophenyl group, 2-nitrophenyl group, 2-chlorophenyl group, 2,4-dichlorophenyl group, 2,4-dimethylpenyl group, 2-methylphenyl group, 4-methoxyphenyl group, 2-methoxyphenyl group, and 2-methoxycarbonyl-4-nitrophenyl group.

The heterocyclic group represented by $R^1$ may be unsubstituted or have a substituent. This may be a saturated group or an unsaturated group, or may be ring-condensed. The heterocyclic group preferably has 3 to 18 carbon atoms in total and examples thereof include 3-pyridyl group, 2-pyridyl group, 2-pyrimidynyl group, 2-benzothiazolyl group, and 5-1,2,4-thiadiazolyl group.

The acyl group represented by $R^1$ may be unsubstituted or have a substituent. This may be aromatic or aliphatic. The acyl group preferably has 2 to 15 carbon atoms in total and examples thereof include an acetyl group, a pivaloyl group, and a benzoyl group.

The aliphaticoxy carbonyl group represented by $R^1$ may be unsubstituted or have a substituent. This may be straight-chained, branched, or cyclic and may be saturated or unsaturated. The aliphaticoxy carbonyl group preferably has 1 to 16 carbon atoms in total. Examples thereof include a methoxycarobonyl group, and a butoxycarbonyl group.

The aryloxy carbonyl group represented by $R^1$ may be unsubstituted or have a substituent. The aryl oxycarbonyl group preferably has 7 to 17 carbon atoms in total and Examples thereof include a phenoxycarbonyl group.

The carbamoyl group represented by $R^1$ may be unsubstituted or have a substituent. The carbamoyl group preferably has 1 to 12 carbon atoms in total and Examples thereof include a carbamoyl and a dimethylcarbamoyl group.

The aliphatic sulfonyl group represented by $R^1$ may be unsubstituted or have a substituent. This may be straight-chained, branched, or cyclic and may be saturated or unsaturated. The aliphatic sulfonyl group preferably have 1 to 15 carbon atoms in total and Examples thereof include a methane sulfonyl group, a butane sulfonyl group, and a methoxyethane sulfonyl group.

The aryl sulfonyl group represented by $R^1$ may be unsubstituted or have a substituent. The aryl sulfonyl group preferably has 6 to 16 carbon atoms in total and Examples thereof include a benzene sulfonyl group, 4-t-butylbenzene sulfonyl group, 4-toluene sulfonyl group, and 2-toluenesulfonyl group.

The sulfamoyl group represented by $R^1$ may be unsubstituted or have a substituent. The sulfamoyl group preferably has 0 to 12 carbon atoms in total and Examples thereof include a sulfamoyl group and a dimethyl sulfamoyl group.

Among them, with a view point of more effectively providing the effect of the invention, $R^1$ is preferably an aliphatic group, an aryl group, or a heterocyclic group, and is more preferably an aryl group or a heterocyclic group.

The substituent for $R^2$ and $R^3$ may be groups as descried in the section on the substituent, which is capable of substitution. With a view point of more effectively providing the effect of the invention, as each of $R^2$ and $R^3$, groups described below are preferred.

That is, $R^2$ is preferably a hydrogen atom, an aliphatic group, an aryl group, an acryloxy group, an acylamino group, an aliphaticoxy group, an aliphatic sulfonyloxy group, an aryl sulfonyloxy group, an aliphatic sulfone amide group, an aryl sulfone amide group, an amino group, aliphataic amino group, an aryl amino group, an aliphatic oxycarbonyl amino group, an aryl oxycarbonyl amino group, a heterocyclic oxycarbonyl amino group, a hydroxyl group, a cyano group, a sulfo group, a carbamoyl amino group, and a sulfamoyl amino group, and more preferably, a hydrogen atom, an aliphatic group, an aryl group, an acyloxy group, an aliphaticoxy group, or an aliphasticsulfonyloxy group, and particularly preferably, a hydrogen atom or an aliphatic group.

Further, $R^3$ is preferably an aliphatic group, an aryl group, an acyl group, an acylamino group, an aliphaticoxy carbonyl group, an aryloxy carbonyl group, a carbamoyl group, an aliphatic sulfonyl group, an aryl sulfonyl group, a hetocyclic sulfonyl group, an aliphatic sulfonyloxy group, an arylsulfonyloxy group, an aliphatic sulfone amide group, an arylsulfone amide group, a cyano group, or a carboxyl group, $X^1$ is preferably selected from a nitrogen atom and —$CR^3$= in a case of representing them. Further, $R^3$ is more preferably an acyl group, an aliphaticoxy carbonyl group, an aliphatic sulfonyl group, an aryl sulfonyl group, a cyano group, and a carboxyl group, $X^1$ is more preferably selected from a nitrogen atom and —$CR^3$= in a case of representing them. Further, $R^3$ is particularly preferably an aliphaticoxy carbonyl group, an aliphatic sulfonyl group, and a cyano group, and $X^1$ is selected particularly preferably from a nitrogen atom and —$CR^3$= in a case of representing them.

The coupler residue represented by A has no particular restriction so long as the group is capable of coupling with a diazonium salt and Examples thereof include a hydrocarbon ring group, a heterocyclic group, or substituted methylene group. The dye represented by the formula (1) is a coupler residue which may constitute either a non-dissociation type pigment or a dissociation type pigment (pigment containing a group dissociating in an alkaline state to form an aimed hue). More specifically, groups represented by the following (A-1) to (A-13) are included.

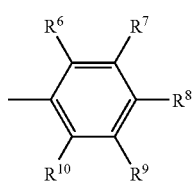
(A-1)

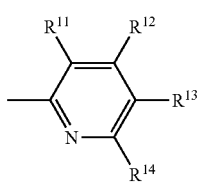
(A-2)

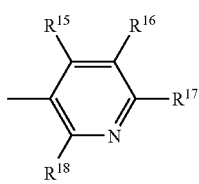
(A-3)

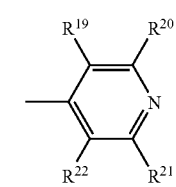
(A-4)

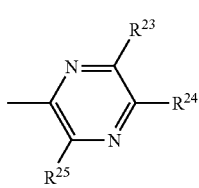
(A-5)

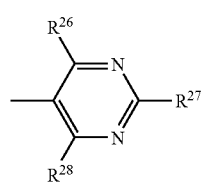
(A-6)

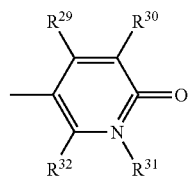
(A-7)

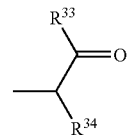
(A-8)

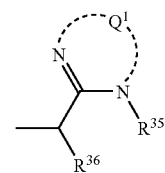
(A-9)

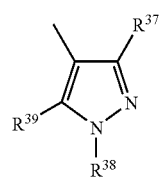
(A-10)

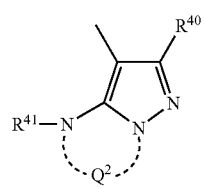
(A-11)

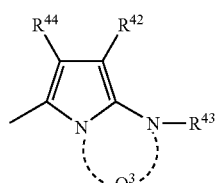
(A-12)

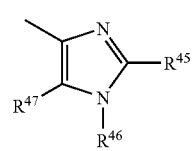
(A-13)

In (A-1) to (A-13), $R^6$ to $R^{47}$ each represents a hydrogen atom or a substituent. The substituent may be the group mentioned in the section on the substituent described above, which is capable of substitution. A preferred substituent is an aliphatic group, an aryl group, a heterocyclic group, an acyl group, an acylamino group, an aliphaticoxy group, an aliphaticoxy carbonyl group, a carbamoyl group, a sulfamoyl group, an aliphatic sulfone amide group, an aryl sulfone amide group, an amino group, an aliphatic amino group, a hydroxyl group, a cyano group, a sulfo group, and a carboxyl group.

Two adjacent groups in $R^6$ to $R^{14}$, $R^{15}$ to $R^{17}$, $R^{45}$ to $R^{47}$ as well as $R^{19}$ and $R^{20}$, $R^{21}$ and $R^{22}$, $R^{23}$ and $R^{24}$, $R^{29}$ and $R^{30}$, $R^{31}$ and $R^{32}$, $R^{33}$ and $R^{34}$, and $R^{35}$ and $R^{36}$ may join to each other, if possible, to form a 5- to 7-membered hydrocarbon group or heterocyclic group. Further, $Q^1$ in (A-9), $Q^2$ in (A-11), and $Q^3$ in (A-12) each represents a group of non-metal atoms necessary for forming a 5- to 7-membered ring together with the nitrogen atom.

Among them, with a view point of more effectively providing the effect of the invention, at least one of $R^6$ and $R^8$, $R^{11}$ and $R^{13}$, $R^{15}$, $R^{17}$ and $R^{18}$, $R^{19}$ and $R^{22}$, $R^{24}$ and $R^{25}$, $R^{26}$, $R^{27}$ and $R^{28}$ is preferably a hydroxyl group and a substituted amino group, and more preferably, a substituted amino group. In the same manner, with a view point of more effectively providing the effect of the invention, $R^{31}$ is preferably an aliphatic group or an aromatic group, and more preferably, an aliphatic group. In the same manner, with a view point of more providing more effectively the effect of the invention, $R^{32}$ is preferably a hydroxyl group, $R^{39}$ is preferably a hydroxyl group or an amino group which may be substituted, and $R^{39}$ is more preferably an amino group which may be substituted. With a view point of more effectively providing the effect of the invention, A is preferably represents (A-1), (A-3), (A-6), or (A-7).

Further, among the dyes represented by the formula (1), with a view point of the effect of the invention, the dye represented by the following formula (2) is more preferred.

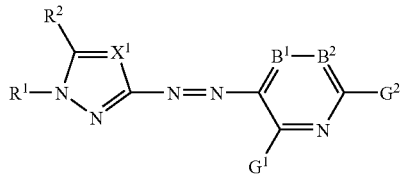

Formula (2)

In the formula (2), $R^1$, $R^2$, and $X^1$ have the same meanings as those for $R^1$, $R^2$, and $X^1$ in the formula (1) and a preferred embodiment for each of them is also identical.

In the formula (2), $B^1$ represents —$CR^4$= or a nitrogen atom and $B^2$ represents —$CR^5$= or a nitrogen atom. $B^1$ and $B^2$ do not simultaneously represent the nitrogen atom. It is preferred that $B^1$ represents —$CR^4$= and $B^2$ represents —$CR^5$= or a nitrogen atom, and it is more preferred that $B^1$ is —$CR^4$= and $B^2$ is nitrogen.

$R^4$ and $R^5$ each independently represents a hydrogen atom or a substituent. In the formula (2), $R^1$ and $R^2$, $R^2$ and $R^3$, $R^4$ and $R^5$, and $R^5$ and $G^2$ may join to each other to form a 5- to 7-membered ring.

The substituent represented by $R^4$ or $R^5$ may be the group described in the section on the substituent described above, and may be a group capable of substitution.

With a view point of more effectively providing the effect of the invention, each $R^4$ and $R^5$ is preferably a hydrogen atom, an aromatic oxy group, an aliphatic group, an aryl group, a heterocyclic group, an acyl group, an acylamino group, an aliphaticoxy group, an aliphaticoxy carbonyl group, a carbamoyl group, a sulfamoyl group, an aliphatic sulfone amide group, an aryl sulfone amide group, an aliphatic amino group, an aryl amino group, a hydroxyl group, a cyano group, a sulfo group, or a carboxyl group, and it is more preferred that $R^4$ is an aliphatic group, an aliphaticoxy group, an aromaticoxy group, an aliphatic amino group, and an aryl amino group, and $R^5$ is a hydrogen atom, an aliphatic group, or a cyano group.

In the formula (2), $G^1$ and $G^2$ each independently represents a hydrogen atom or a substituent. The substituent of $G^1$ and $G^2$ is a group described in the section on the substituent, which may be a group capable of substitution.

With a view point of more effectively providing the effect of the invention, $G^1$ and $G^2$ is preferably a hydrogen atom, an aliphatic group, an aryl group, a heterocyclic group, an acyloxy group, an acylamino group, an aliphaticoxy group, an aryloxy group, a heterocyclic oxy group, an aliphatic sulfone amide group, an aryl sulfone amide group, a heterocyclic sulfone amide group, an amino group, an aliphatic amino group, an arylamino group, a heterocyclic amino group, an aliphatic oxycarbonyl amino group, an aryl oxycarbonyl amino group, a heterocyclic oxycarbonyl amino group, an aliphatic thio group, an aryl thio group, a hydroxyl group, a cyano group, a sulfo group, a carboxyl group, a carbamoyl amino group, a sulfamoyl amino group, and a halogen atom, more preferably, a hydrogen atom, an aliphatic group, a heterocyclic group, an acylamino group, an aliphatic oxy group, an aryloxy group, an aliphatic sulfone amide group, an aryl sylfone amide group, an aliphatic amino group, an aryl amino group, a heterocyclic amino group, an aliphatic thio group, an aryl thio group, and a halogen atom, and more preferably, an aliphaticoxy group, an aliphatic amino group, an aryl amino group, and an aliphatic thio group, and further, preferably a mode where at least one of $G^1$ and $G^2$ represents an aliphatic amino group or arylamino group.

$R^1$ and $R^2$, $R^2$ and $R^3$, $R^4$ and $R^5$, and $R^5$ and $G^2$ may join with each other to form a 5- to 7-membered ring (may be aromatic ring or non-aromatic ring, and a carbon ring or heterocyclic ring, for example, benzene ring or pyridine ring).

Specific examples of the dye represented by the formula (1) include specific examples of the formula (1) as described in JP-A No. 2005-213357 and specific examples of the formula (1) described in JP-A No. 2005-215286.

Specific examples of the dye monomer represented by the formula (P) are presented below. However, the dye monomer used in the invention is not restricted to the following examples.

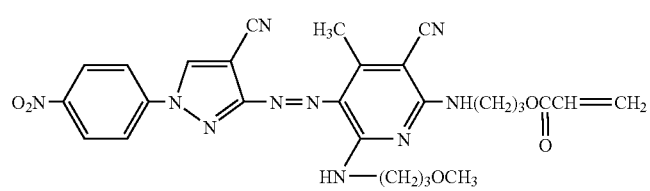

(1)

-continued
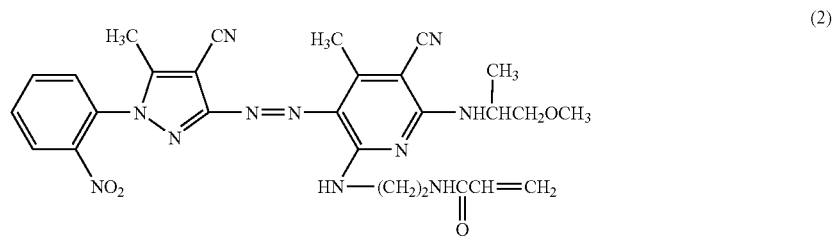
(2)
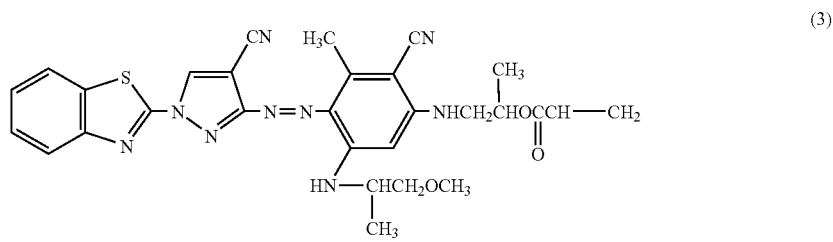
(3)
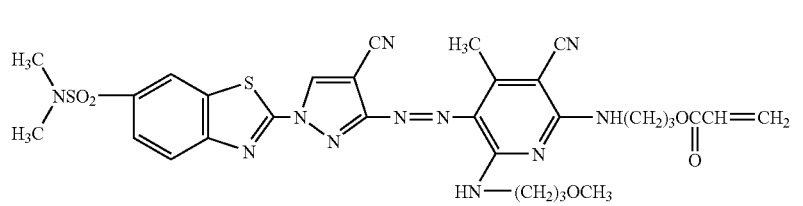
(4)
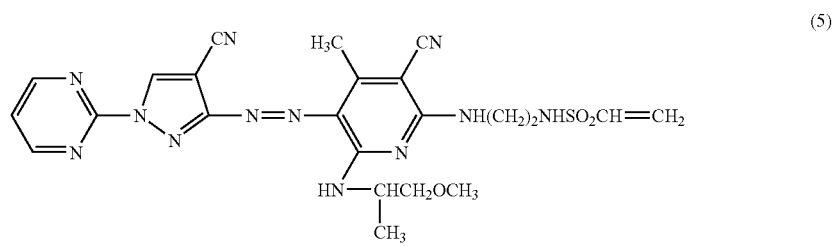
(5)
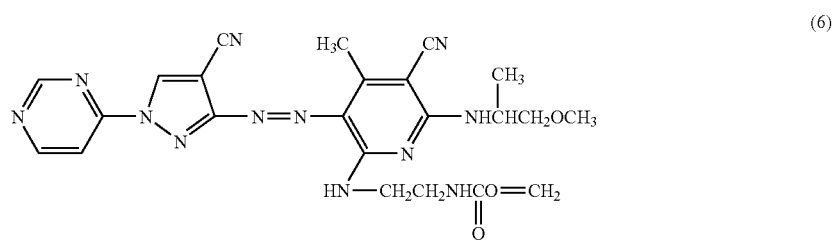
(6)
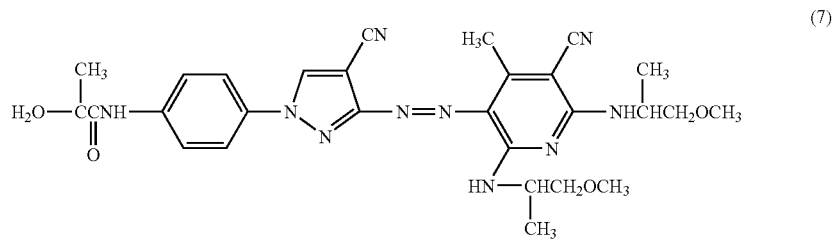
(7)
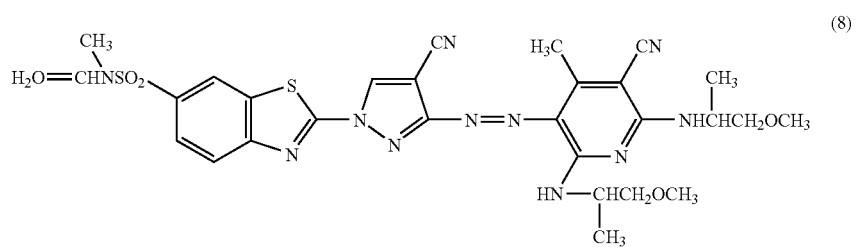
(8)

-continued
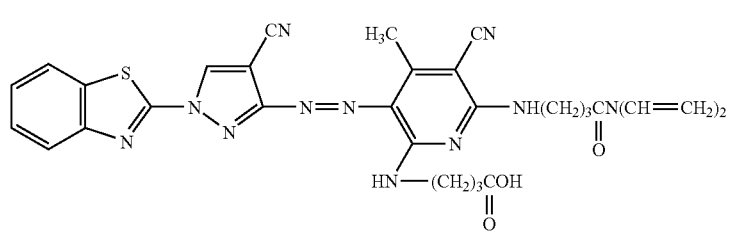
(9)
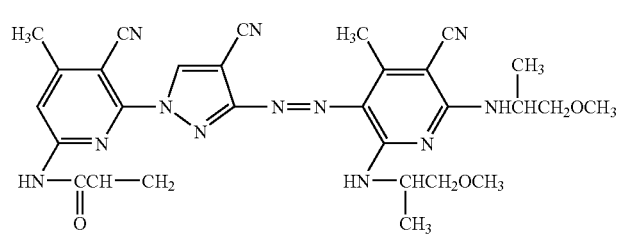
(10)
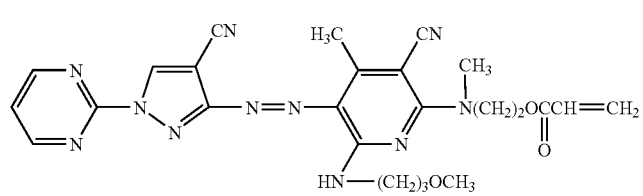
(11)
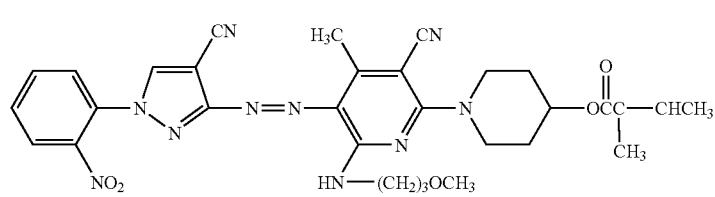
(12)
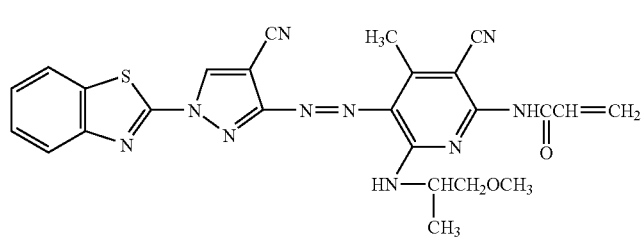
(13)
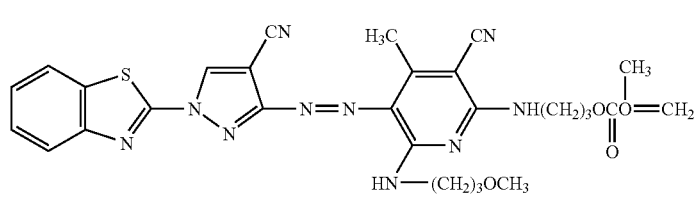
(14)
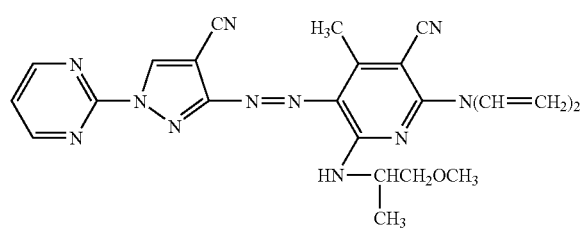
(15)

-continued
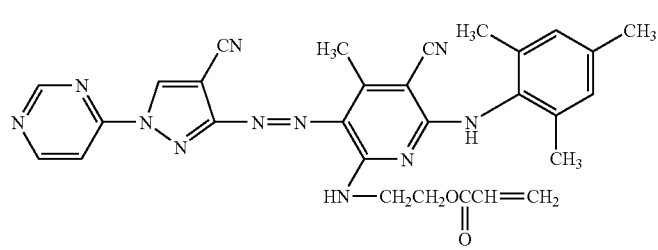
(16)
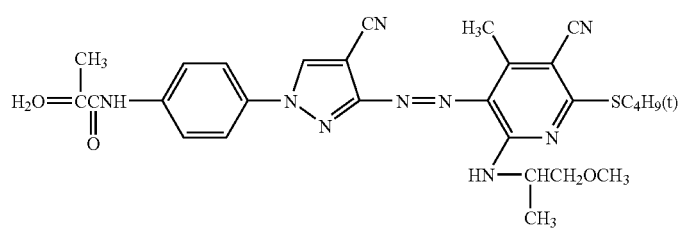
(17)
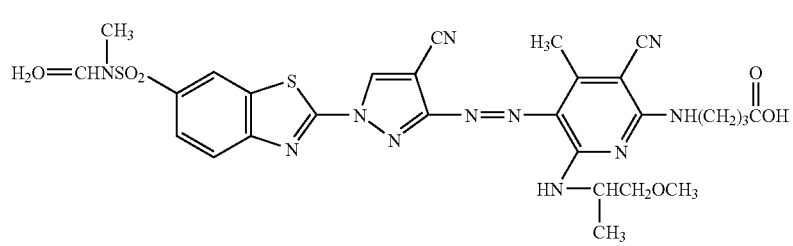
(18)
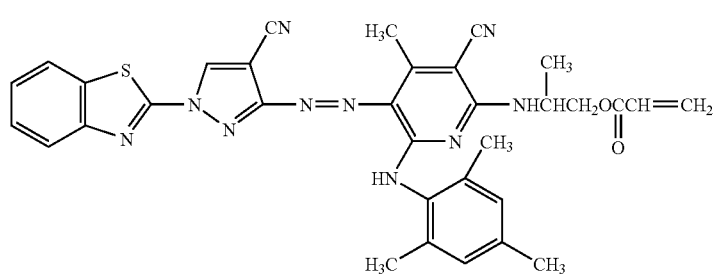
(19)
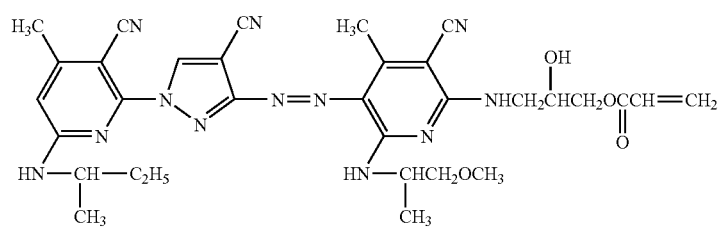
(20)
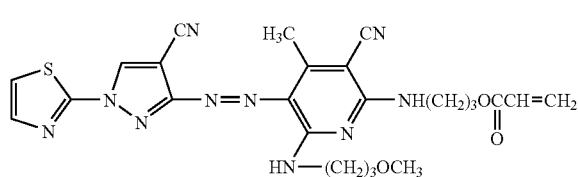
(21)
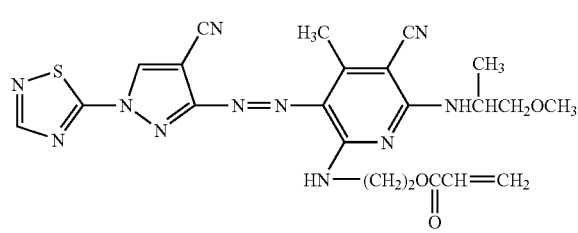
(22)

-continued
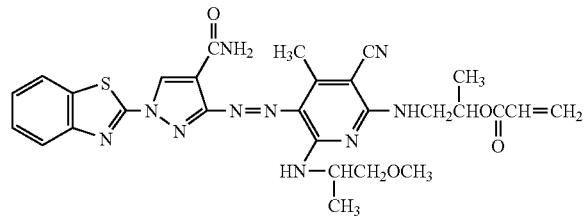
(23)
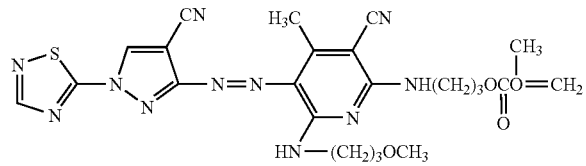
(24)
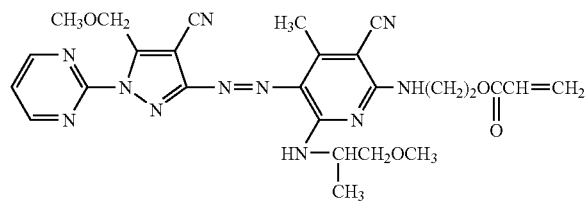
(25)
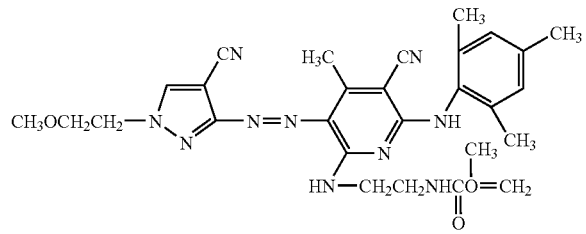
(26)
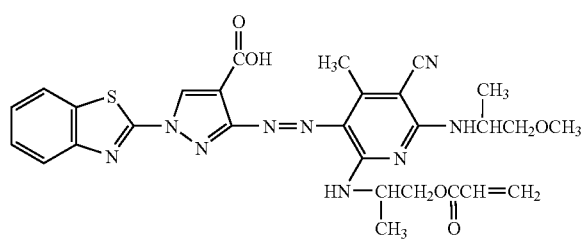
(27)
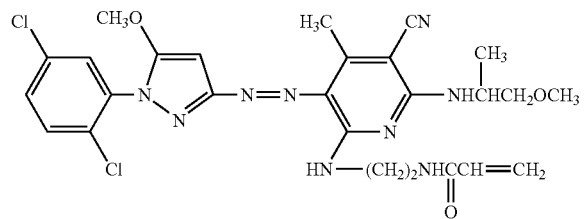
(28)
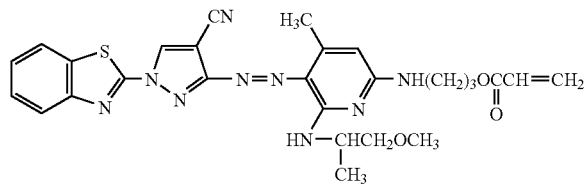
(29)

-continued
(30)
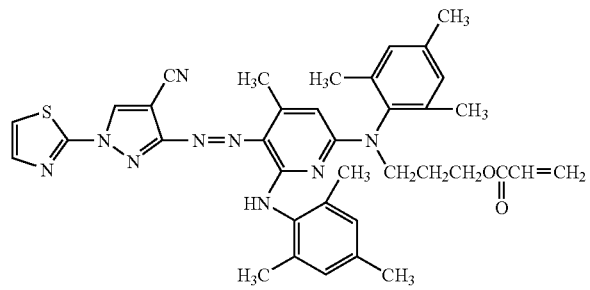
(31)
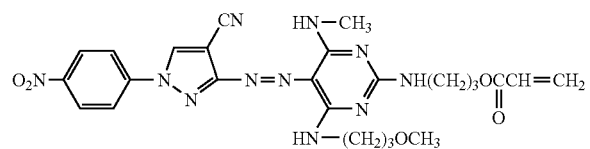
(32)
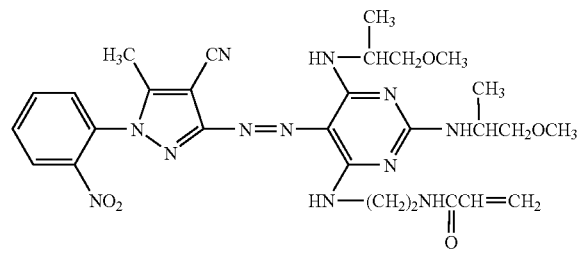
(33)
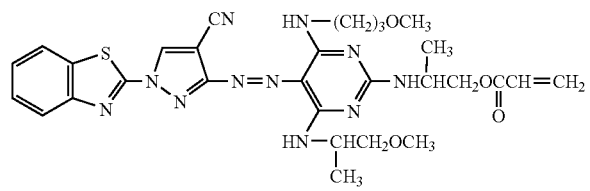
(34)
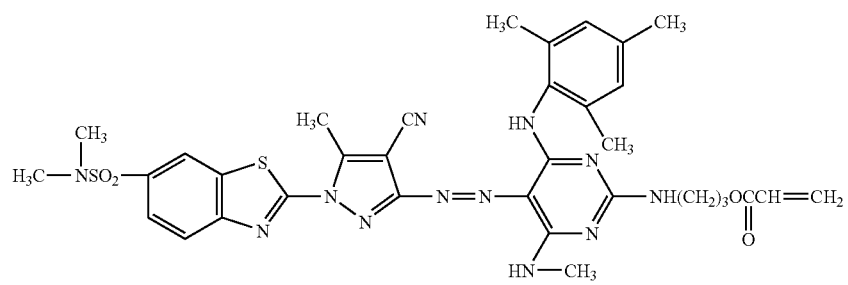
(35)
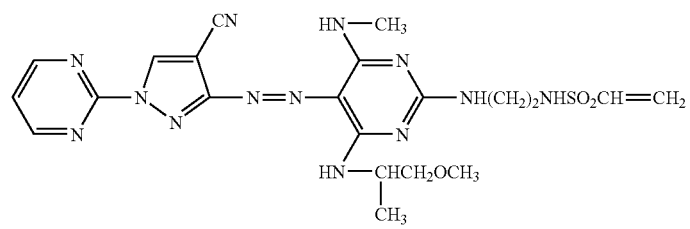
(36)
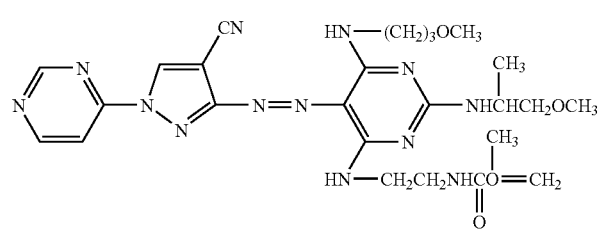

-continued
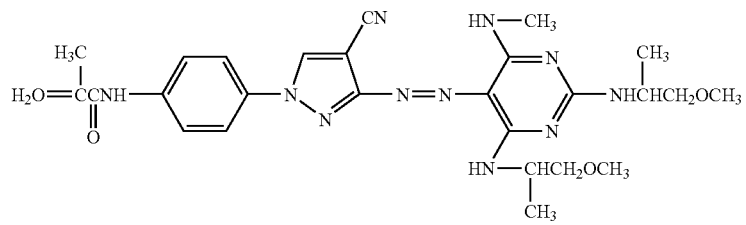
(37)
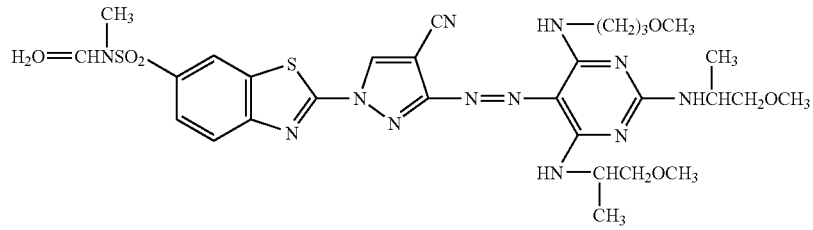
(38)
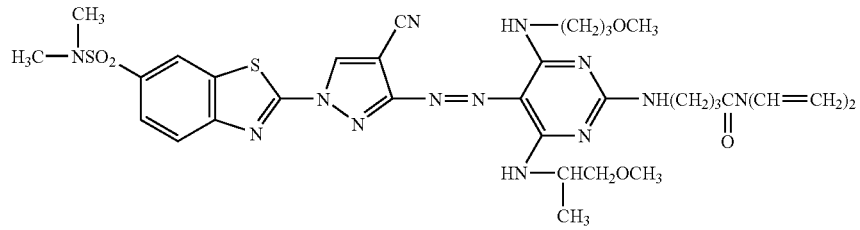
(39)
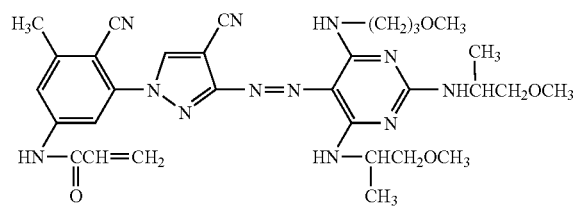
(40)
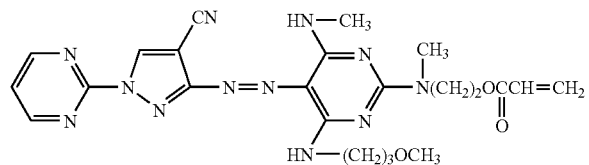
(41)
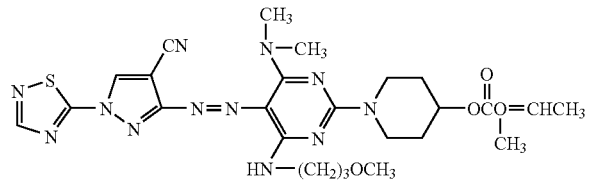
(42)
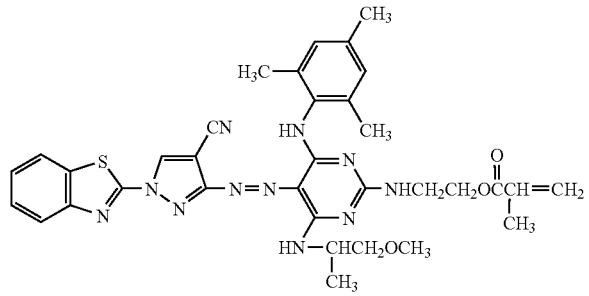
(43)

-continued
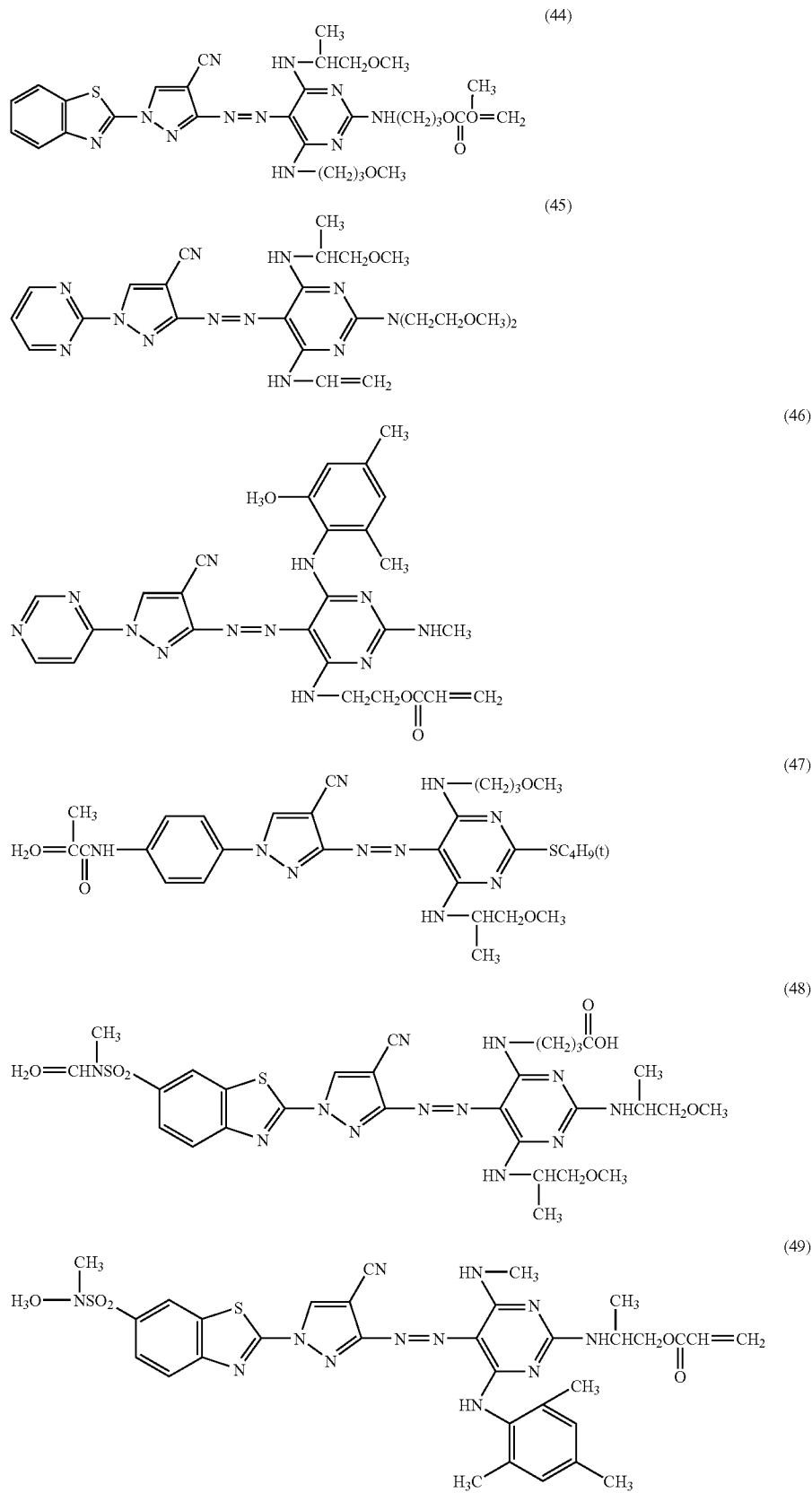

-continued
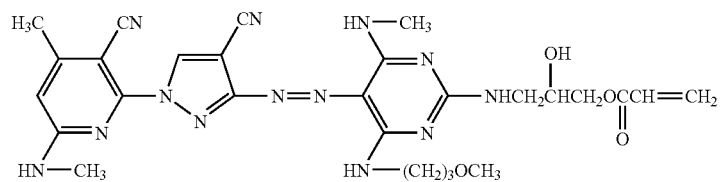
(50)
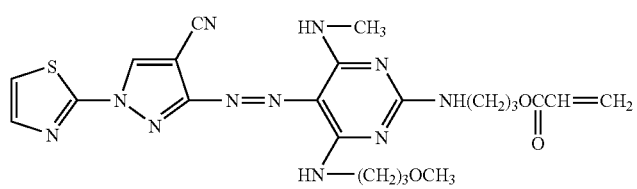
(51)
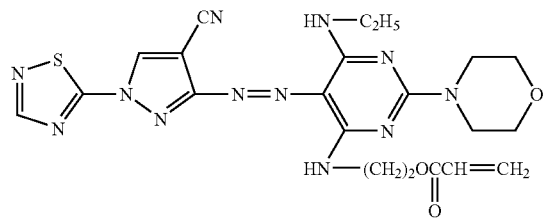
(52)
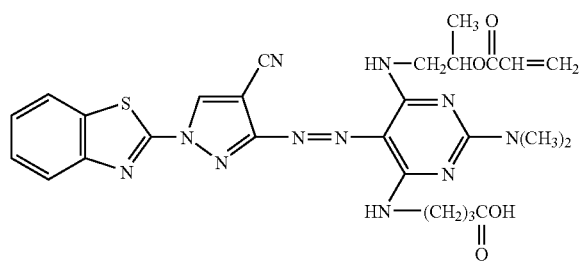
(53)
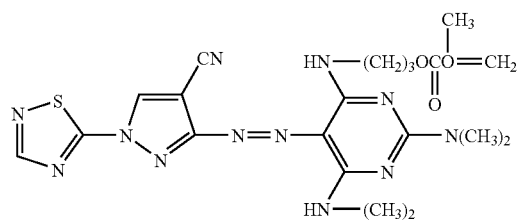
(54)
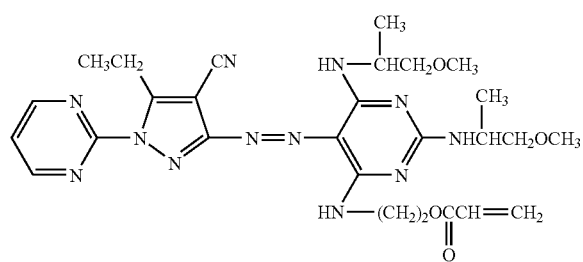
(55)

-continued
(56)
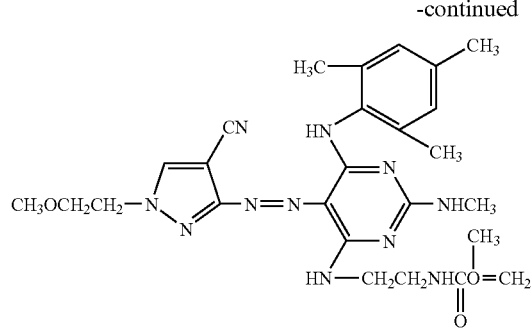
(57)
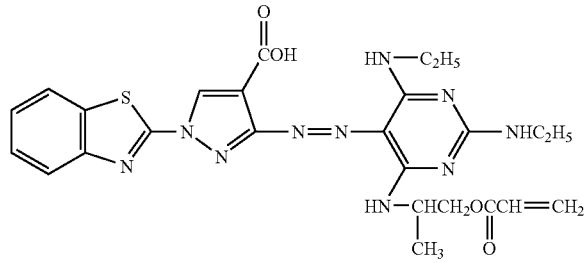
(58)
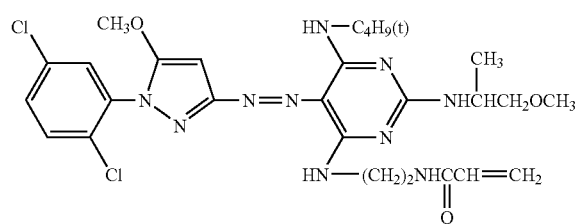
(59)
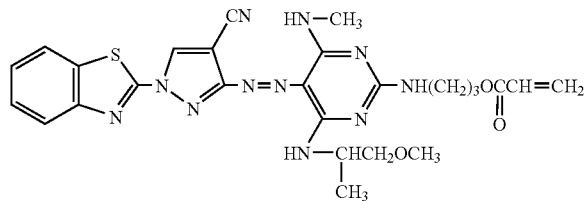
(60)
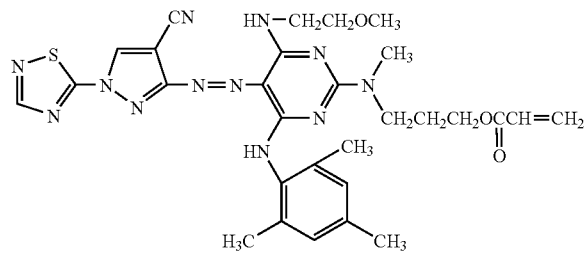
(61)
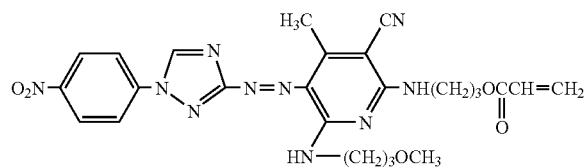
(62)
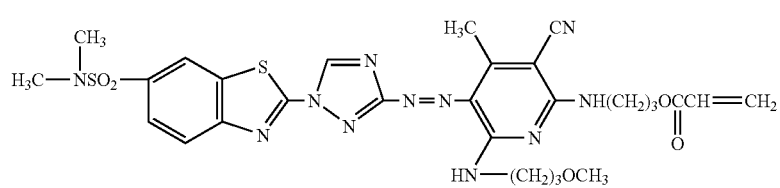

-continued
(63)
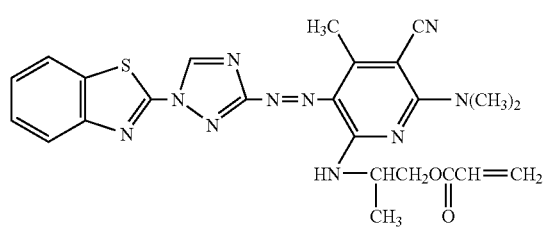
(64)
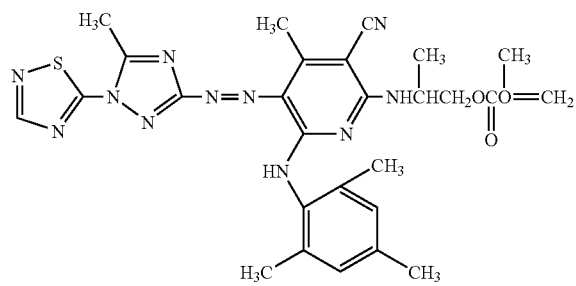
(65)
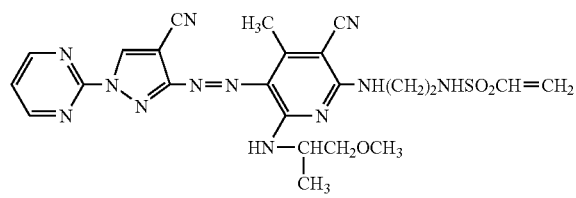
(66)
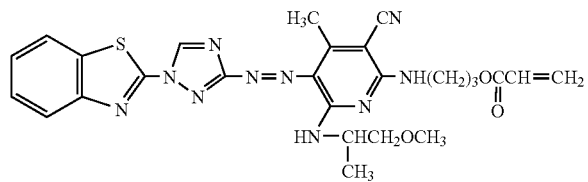
(67)
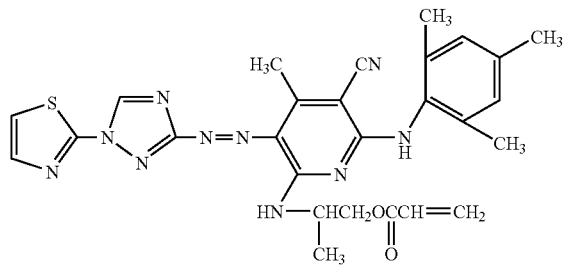
(68)
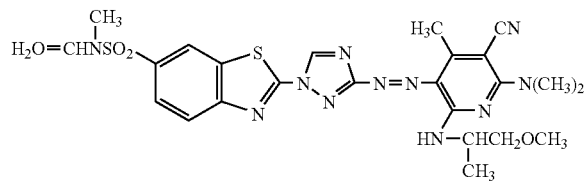
(69)
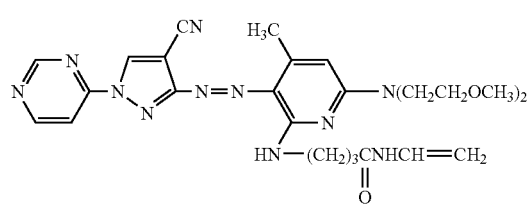

-continued
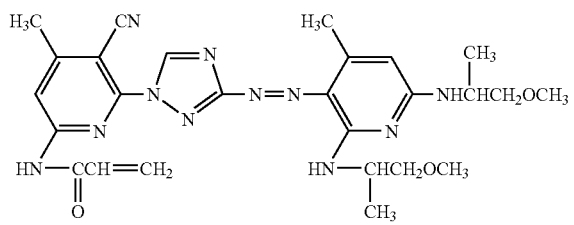
(70)
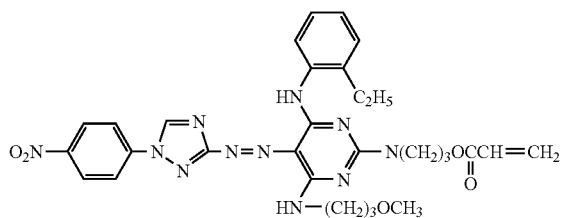
(71)
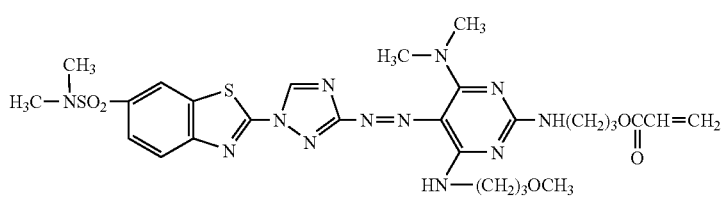
(72)
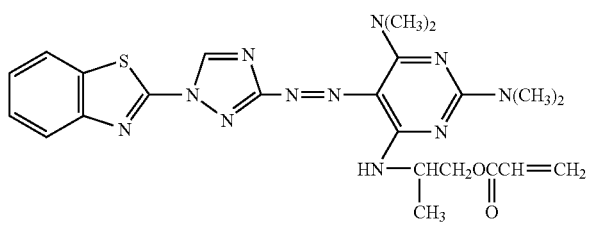
(73)
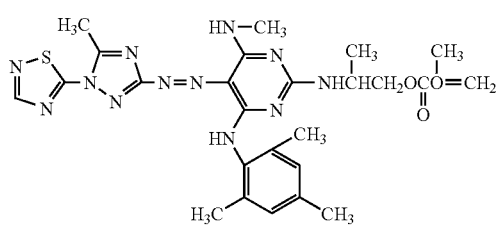
(74)
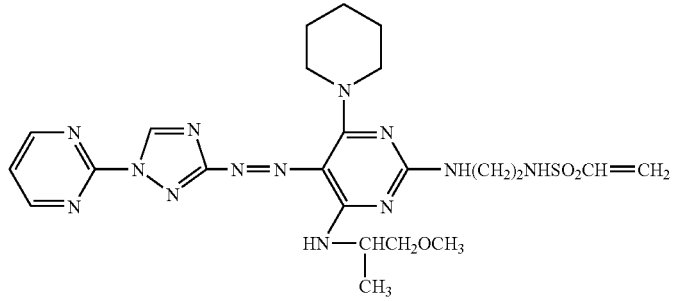
(75)
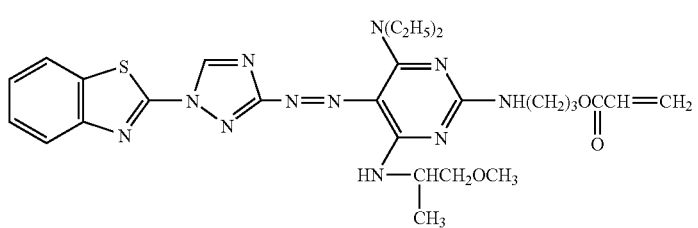
(76)

-continued
(77)
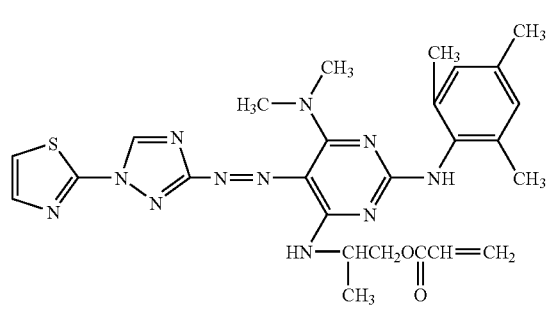
(78)
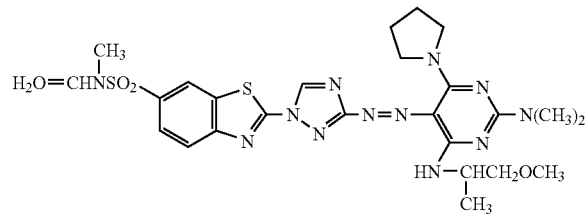
(79)
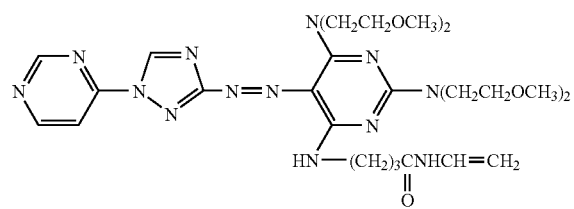
(80)
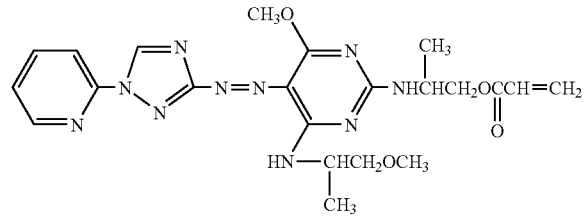
(81)
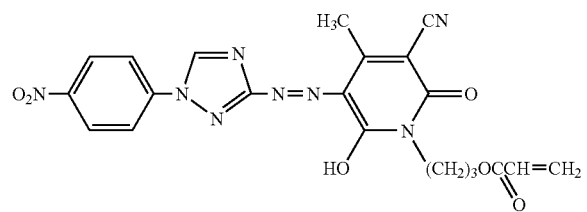
(82)
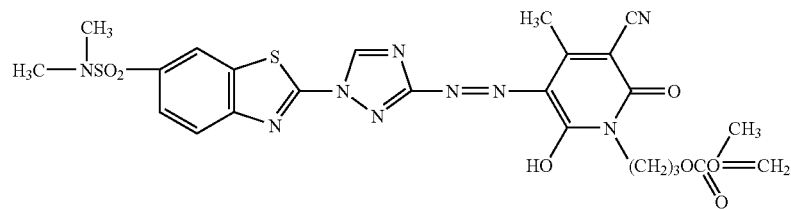
(83)
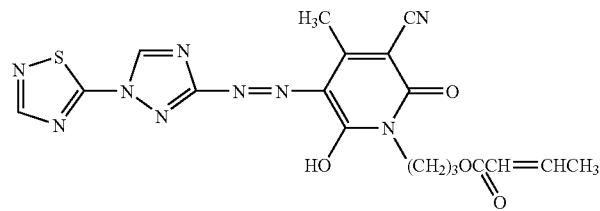

-continued
(84)
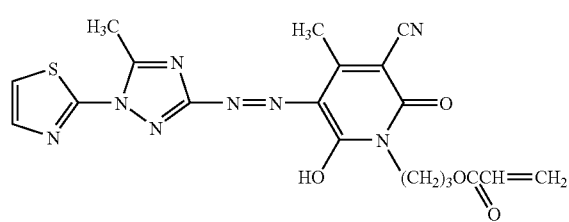
(85)
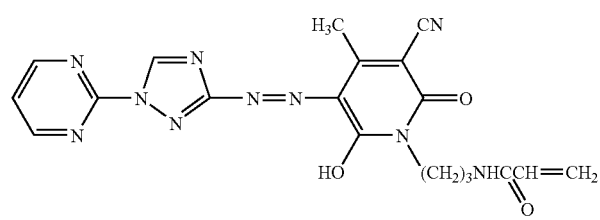
(86)
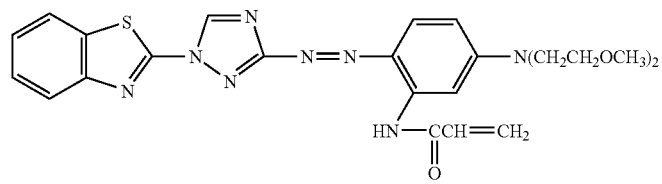
(87)
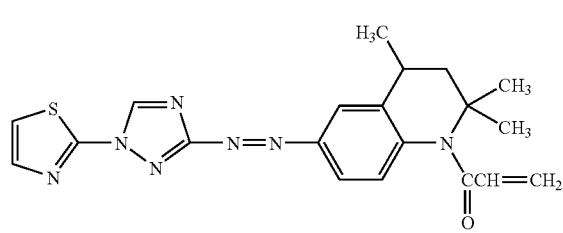
(88)
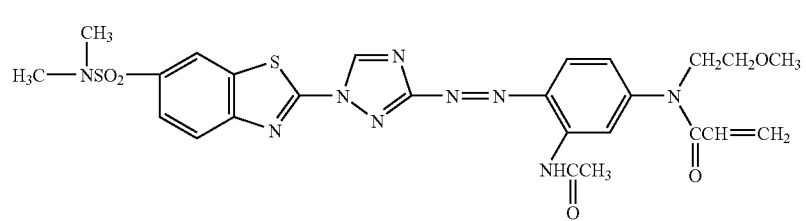
(89)
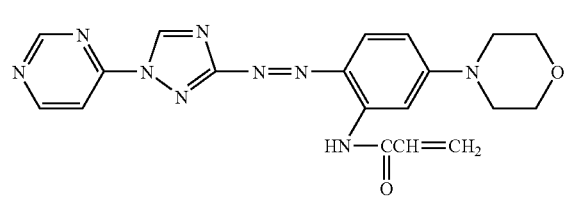
(90)
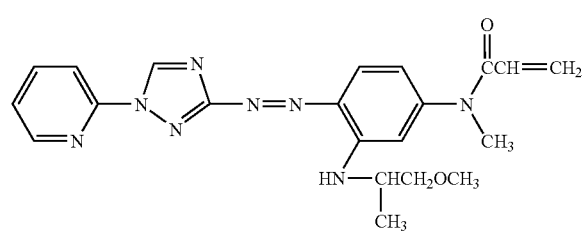

-continued
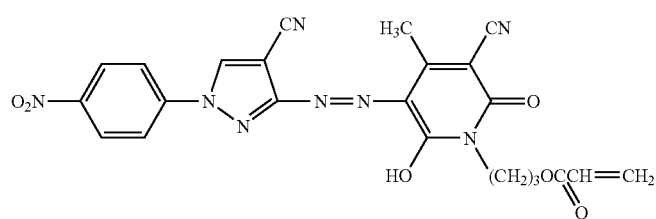
(91)
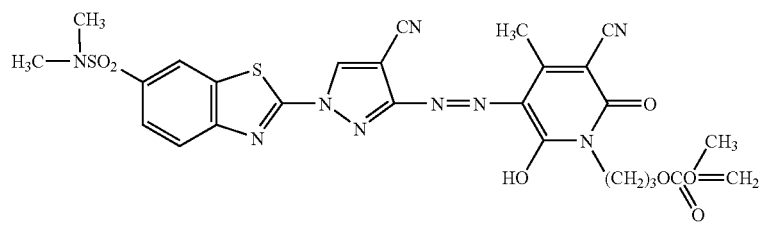
(92)
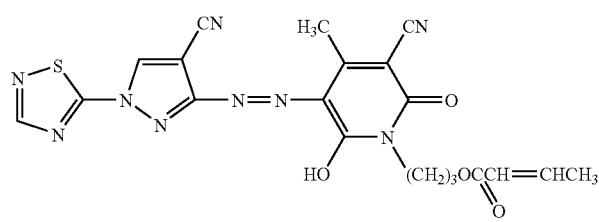
(93)
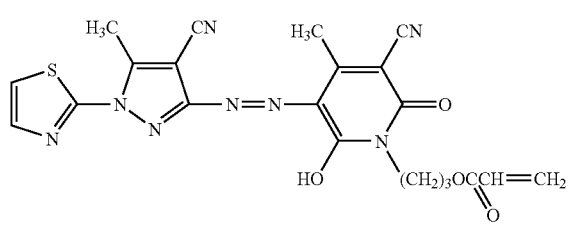
(94)
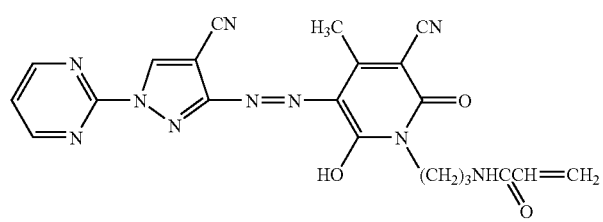
(95)
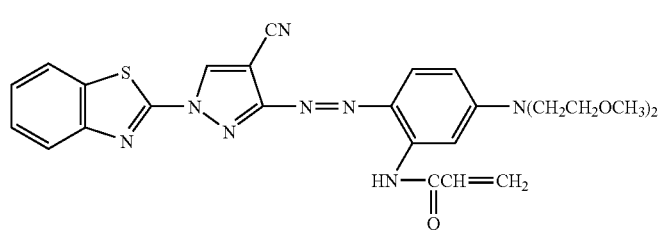
(96)
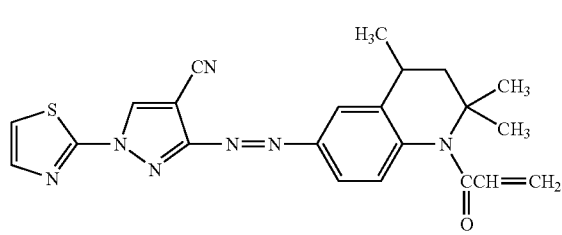
(97)

-continued
(98)
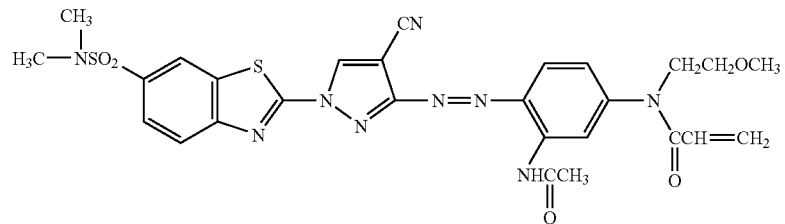
(99)
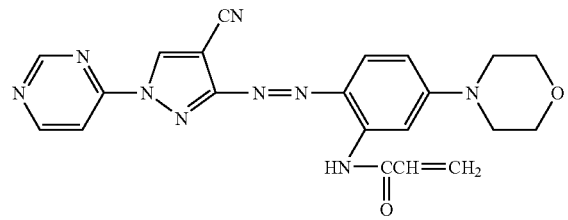
(100)
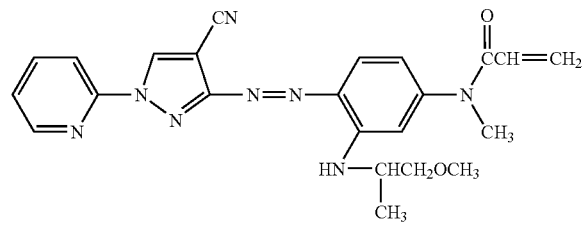
(101)
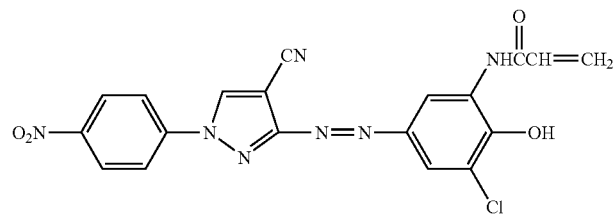
(102)
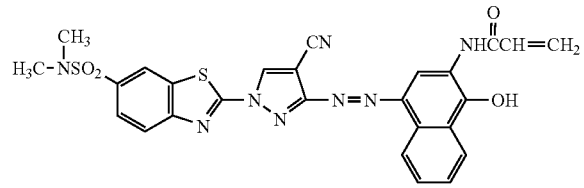
(103)
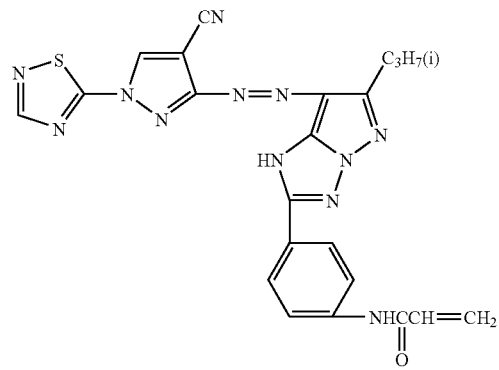

-continued

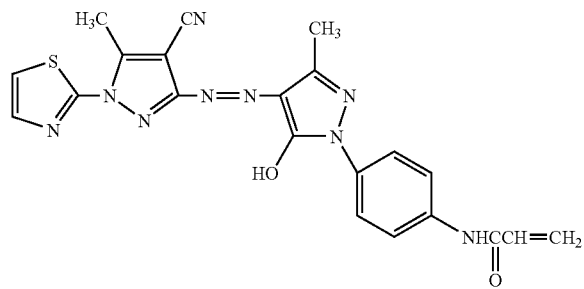
(104)

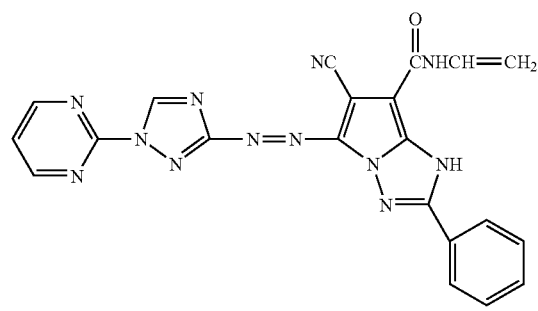
(105)

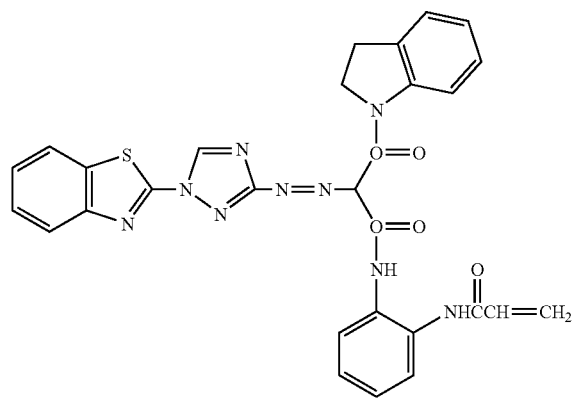
(106)

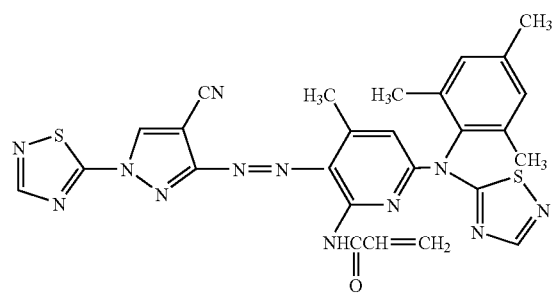
(107)

The dye monomer of the invention can be synthesized in accordance with the synthesis method for the dye of the formula (1) as described in JP-A No. 2005-213357, and dyes of the formula (1) as described in JP-A No. 2005-215286.

[Colorless Monomer Having Ethylenic Double Bond]

"The colorless monomer having the ethylenic double bond" includes (meth)acrylic acids such as an acrylic acid, α-chloroacrylic acid, α-alkyl acrylic acid (for example, methacrylic acid), and β-alkyl acrylic acid (for example, crotonic acid), and salts derived therefrom, esters or amides (for example, acrylamide, methacrylamide, t-butylacrylamide, sodium 2-acrylamide-2-methylpropane sulfonate, sodium 3-acryloyloxypropane sulfonate, methyl acrylate, methyl methacrylate, ethyl acrylate, n-propyl acrylate, i-propyl acrylate, n-butyl acrylate, t-butyl acrylate, n-butyl methacrylate, 2-ethylhexyl acrylate, n-hexyl acrylate, n-octyl acrylate, glycidyl methacrylate, and methylene bis acrylamide), maleic acid, fumaric acid, itaconic acid, vinyl ester (for example, vinyl acetate, vinylpropionate, and vinyl laurate), acrylonitrile, methacryronitrile, aromatic vinyl compound (for example, styrene, potassium styrene sulfate, and sodium styrene sulfonate), vinylidene chloride, vinyl alkyl ether (for example, vinyl ethyl ether), maleic acid ester, N-vinyl-2-pyrrolidone, N-vinylpyridine, and 2- and 4-vinyl pyridine.

The colorless monomer may be multi-functional colorless monomer having a plurality of them.

With a view point of more effectively providing effect of the invention, "the colorless monomer having ethylenic double bond" is preferably acrylic acids, methacrylic acids, acrylate esters, methacrylate esters, acryl amides, styrene and styrene derivatives, and more preferably, acrylic acids, methacrylic acids, acrylate esters, methacrylate esters, acrylamides, and styrene derivatives containing water soluble groups, for example, hydroxyl group, carboxyl group, and sulfo group. Among them, methyl acrylate, methacrylic acid, crotonic acid, acrylic acid, styrene, t-butyl acrylamide, acryl amide, potassium styrene sulfonate, sodium styrene sulfonate, sodium 2-acrylamide-2-methylpropane sulfonate, sodium 3-acryloyloxy propane sulfonate are further preferred.

The polymer dye used in the invention may be water soluble or water insoluble. In the polymer dye, the water soluble group may be present on the dye monomer or on the colorless monomer having the ethylenic double bond, or present on the both of them. With a view point of more effectively providing the effect of the invention, those having a hydrophilic group in the polymer dye of the invention are preferred. The hydrophilic group is, for example, a phosphoric acid portion, a phosphate ester portion, a quaternary ammonium salt portion, or a portion of ethyleneoxy chain, a propyleneoxy chain, a hydroxyl group, a carboxylic acid, a sulfonic acid, or a salts thereof, and more preferably, a portion of an ethyleneoxy group, a propyleneoxy group, a hydroxyl group, a carboxylic acid, a sulfonic acid or salts thereof.

As the polymer dye used in the invention, the dye monomer represented by the formula (P) may be used alone, or two or more of them may be used, or this may be used together with other polymerizable group-containing dye monomer having the ethylenic double bond. Further, also the colorless monomer having the ethylenic double bond may be used alone or two or more of them may be used.

The polymer dye used in the invention can be synthesized in accordance with the synthesis method described, for example, in U.S. Pat. No. 3,451,820, and JP-A Nos. 62-276548 and 60-218646.

Specific examples of the polymer dye of the invention (Exemplified Compound P-1 to P-70) are presented below.

TABLE 1

| Polymer dye No. | Dye monomer (dye of formula (P)) Compound No. | Mol number | Copolymerizable monomer Abbreviation** | Amount of use (Molar ratio to dye monomer) |
|---|---|---|---|---|
| P-1 | (3) | 1 | AA | 1 |
| P-2 | (6) | 1 | MAA | 0.5 |
| P-3 | (11) | 1 | AA | 1 |
| P-4 | (19) | 1 | SSK | 0.5 |
| P-5 | (21) | 1 | AA | 1 |
| P-6 | (24) | 1 | MAA | 1 |
| P-7 | (30) | 1 | SSN | 1 |
| P-8 | (33) | 1 | AA | 1 |
| P-9 | (36) | 1 | MAA | 1 |
| P-10 | (40) | 1 | AA | 1 |
| P-11 | (43) | 0.75 | AA | 1 |
| P-12 | (49) | 1 | AA | 1 |
| P-13 | (52) | 1 | AA | 0.8 |
| P-14 | (53) | 1 | MA | 0.8 |
| P-15 | (59) | 1 | AA | 1 |
| P-16 | (63) | 1 | AA | 0.5 |
| P-17 | (74) | 1 | MAA | 0.6 |
| P-18 | (82) | 1 | MAA | 1 |

TABLE 1-continued

| Polymer dye No. | Dye monomer (dye of formula (P)) Compound No. | Mol number | Copolymerizable monomer Abbreviation** | Amount of use (Molar ratio to dye monomer) |
|---|---|---|---|---|
| P-19 | (89) | 1 | AA | 0.5 |
| P-20 | (96) | 1 | AMPSN | 0.25 |

Abbreviation**
MA: methyl acrylate
MAA: methacrylic acid
AA: acrylic acid
SSK: potassium styrene sulfinate
SSN: Sodium styrene sulfonate
AMPSN: Sodium 2-acrylamide-2-methylpropane sulfonate

TABLE 2

| Polymer dye No. | Dye monomer (dye of formula (P)) Compound No. | Mol number | Copolymerizable monomer Abbreviation** | Amount of use (Molar ratio to dye monomer) |
|---|---|---|---|---|
| P-21 | (3) | 1 | AA | 0.5 |
| P-22 | (6) | 1 | APSN | 0.5 |
| P-23 | (11) | 1 | CA | 1 |
| P-24 | (19) | 1 | SSK | 0.5 |
|  |  |  | MA | 0.5 |
| P-25 | (21) | 1 | AA | 0.8 |
|  |  |  | AAM | 0.2 |
| P-26 | (24) | 1 | MAA | 0.75 |
| P-27 | (30) | 1 | SSN | 0.5 |
|  |  |  | AAM | 0.5 |
| P-28 | (33) | 1 | AMPSN | 1 |
| P-29 | (3) | 0.5 | AA | 1 |
|  | (33) | 0.5 |  |  |
| P-30 | (19) | 0.5 | AA | 1 |
|  | (40) | 0.5 |  |  |
| P-31 | (43) | 0.75 | AA | 1 |
|  | (82) | 0.25 |  |  |
| P-32 | (49) | 1 | AA | 1 |
|  |  |  | SSN | 0.1 |
| P-33 | (52) | 1 | AA | 0.8 |
|  |  |  | t-BAM | 0.1 |
| P-34 | (53) | 1 | MA | 0.7 |
|  |  |  | St | 0.1 |
| P-35 | (59) | 0.8 | AA | 1 |
|  | (3) | 0.2 |  |  |

Abbreviation**
MA: methyl acrylate
MAA: methacrylic acid
CA: crotonic acid
AA: acrylic acid
t-BAM: t-butyl acrylamide
AAM: acryl amide
SSK: potassium styrene sulfinate
SSN: Sodium styrene sulfonate
AMPSN: Sodium 2-acrylamide-2-methylpropane sulfonate
APSN: sodium 3-acryloyloxypropane sulfonate
St: styrene

TABLE 3

| Polymer dye No. | Dye monomer (dye of formula (P)) Compound No. | Mol number | Copolymerizable monomer Abbreviation** | Amount of use (Molar ratio to dye monomer) |
|---|---|---|---|---|
| P-36 | (3) | 0.5 | AA | 0.75 |
|  | (63) | 0.5 |  |  |

TABLE 3-continued

| Polymer dye No. | Dye monomer (dye of formula (P)) Compound No. | Mol number | Copolymerizable monomer Abbreviation** | Amount of use (Molar ratio to dye monomer) |
|---|---|---|---|---|
| P-37 | (74) | 1 | SSN | 0.5 |
| P-38 | (24) | 0.2 | MAA | 1 |
|  | (82) | 0.8 |  |  |
| P-39 | (59) | 0.5 | AA | 0.5 |
|  | (89) | 0.5 | AAM | 0.1 |
| P-40 | (96) | 1 | AMPS | 0.25 |
|  |  |  | AAM | 0.25 |
| P-41 | (3) | 1 | none | — |
| P-42 | (6) | 1 | none | — |
| P-43 | (11) | 1 | none | — |
| P-44 | (19) | 1 | none | — |
| P-45 | (21) | 1 | none | — |
| P-46 | (24) | 1 | none | — |
| P-47 | (30) | 1 | none | — |
| P-48 | (33) | 1 | none | — |
| P-49 | (36) | 1 | none | — |
| P-50 | (40) | 1 | none | — |

Abbreviation**
MAA: methacrylic acid
AA: acrylic acid
AAM: acrylamide
SSN: Sodium styrene sulfonate
AMPSN: Sodium 2-acrylamide-2-methylpropane sulfonate

TABLE 4

| Polymer dye No. | Dye monomer (dye of formula (P)) Compound No. | Mol number | Copolymerizable monomer Abbreviation** | Amount of use (Molar ratio to dye monomer) |
|---|---|---|---|---|
| P-51 | (43) | 1 | none | — |
| P-52 | (49) | 1 | none | — |
| P-53 | (52) | 1 | none | — |
| P-54 | (53) | 1 | none | — |
| P-55 | (59) | 1 | none | — |
| P-56 | (63) | 1 | none | — |
| P-57 | (74) | 1 | none | — |
| P-58 | (82) | 1 | none | — |
| P-59 | (89) | 1 | none | — |
| P-60 | (96) | 1 | none | — |
| P-61 | (3) | 0.75 | none | — |
|  | (74) | 0.25 | none | — |
| P-62 | (19) | 0.5 | none | — |
|  | (53) | 0.5 | none | — |
| P-63 | (53) | 0.5 | none | — |
|  | (80) | 0.5 | none | — |
| P-64 | (53) | 0.8 | none | — |
|  | (63) | 0.2 | none | — |
| P-65 | (4) | 0.7 | none | — |
|  | (53) | 0.2 | none | — |
|  | (89) | 0.1 | none | — |
| P-66 | (107) | 1 | none | — |
| P-67 | (53) | 0.5 | none | — |
|  | (107) | 0.5 | none | — |
| P-68 | (9) | 0.5 | none | — |
|  | (19) | 0.5 | none | — |
| P-69 | (43) | 0.4 | none | — |
|  | (53) | 0.6 | none | — |
| P-70 | (9) | 0.7 | none | — |
|  | (38) | 0.3 | none | — |

The mass average molecular weight (polystyrene-equivalent value measured by GPC method) of the polymer dye used in the invention is preferably from $1 \times 10^3$ to $2 \times 10^5$ more preferably, from $2 \times 10^3$ to $1 \times 10^5$, and further preferably, from $3 \times 10^3$ to $5 \times 10^4$.

The proportion of the dye portion in the polymer dye used in the invention is preferably 2 to 100% by mass, and with a view point of more effectively providing the effect of the invention, more preferably 15 to 90% by mass, and further preferably 30 to 90% by mass.

The total concentration of the polymer dye in the colored curable composition of the invention depends on the molecular weight and the a molar absorption coefficient. The total concentration of the polymer dye is preferably 0.5 to 80% by mass, and more preferably, 0.5 to 70% by mass, and particularly preferably, 1 to 70% by mass, based on the total solid ingredient of the colored curable composition.

In the polymer dye, the ratio of copolymerization (molar ratio) of at least one kind of dye monomer represented by the formula (P) to at least one kind of the colorless monomer having at least one ethylenic double bond is preferably 5:1 to 1:20, and more preferably, 4.5:1 to 1:10.

[Binder]

The colored curable composition of the invention comprises at least one of binder. The binder used in the invention is not particularly restricted so long as it is soluble in an alkali. The binder is preferably selected from the viewpoint of heat resistance, development ability and availability.

The alkali-soluble binder is preferably a linear organic polymer, soluble in organic solvents, and is able to be developed with a weak aqueous alkali solution. Such linear organic polymers include polymers having carboxylic acids at the side chains. Examples of the polymer having carboxylic acids at the side chains include methacrylic acid copolymers, acrylic acid copolymers, itaconic acid copolymers, crotonic acid copolymers, maleic acid copolymers and partially esterified maleic acid copolymers as described in JP-A Nos. 59-44615, 59-53836 and 59-71048, and Japanese Patent Application Publication (JP-B) Nos. 54-34327, 58-12577 and 54-25957.

Otherwise, acidic cellulose derivatives having carboxylic acids at the side chains are preferable as the alkali-soluble binder.

Other preferable alkali-soluble binders include adducts of acid anhydrides to polymers having hydroxyl groups, polyhydroxystyrene resins, polysiloxane resins, poly(2-hydroxyethyl(meth)acrylate), polyvinyl pyrrolidone, polyethylene oxide and polyvinyl alcohol.

A Hydrophilic monomer may be copolymerized with the alkali-soluble binder. Examples of such monomer include alkoxyalkyl(meth)acrylate, hydroxyalkyl (meth)acrylate, glycerol (meth)acrylate, (meth)acrylamide, N-methylol acrylamide, secondary or tertiary alkyl acrylamide, dialkylaminoalkyl(meth)acrylate, morpholine (meth)acrylate, N-vinyl pyrrolidone, N-vinyl caprolactam, vinyl imidazole, vinyl triazole, methyl(meth)acrylate, ethyl(meth)acrylate, branched or linear propyl(meth)acrylate, branched or linear butyl(meth) acrylate, and phenoxyhydroxypropyl(meth)acrylate.

Other preferable hydrophilic monomers include those containing tetrahydrofurfulyl group, phosphate, phosphate ester, quaternary ammonium salt, ethyleneoxy chain, propyleneoxy chain, sulfonic acid group and salts thereof, and morpholinoethyl groups.

With a view point of improving the cross-linking efficiency, alkali-soluble binder may be present a polymerizable group on the side chain, and as the alkali-soluble binder, polymers containing an allyl group, a (meth)acrylic group, an aryloxy alkyl group, and that like. on the side chain are also used.

Examples of the polymers having the polymerizable groups include KS resist-106 (manufactured by Osaka Organic chemical Industry Ltd.), and Cyclomer P series (manufactured by Daicel Chemical Industries, Ltd.).

Further, for improving the strength of the cured film, an alcohol soluble nylon and a polyether of 2,2-bis(4-hydroxyphenyl)-propane and epichlorohydrin are also useful.

Among these binders, polyhydroxystyrene resins, polysiloxane resins, acrylic resins, acrylamide resins and acrylic/acrylamide copolymer resins are preferable, and acrylic resins, polyhydroxystyrene resins and polysiloxane resins are more preferable from the viewpoint of thermal resistance. The acrylic resins, acrylamide resins and acrylic/acrylamide copolymer resins are preferable from the viewpoint of development controlling ability.

Examples of the acrylic resin includes copolymers comprising the monomers selected from benzyl(meth)acrylate, (meth)acrylic acid, hydroxyethyl(meth)acrylate and (meth)acrylamide, and KS Resist 106 (manufactured by Osaka Organic Chemical Industry Ltd.), Cyclomer P series (manufactured by Daicel Chemical Industry Co.).

Further, as the binder used in the invention, an alkali soluble phenol resin can be used. The alkali soluble phenol resin can be used suitably in a case of constituting the colored curable composition of the invention to a positive type and includes, for example, a novolac resin or vinyl polymer.

The novolac resin includes, for example, compounds obtained by condensation of phenols and aldehydes under the presence of an acid catalyst.

The phenols include, for example, a phenol, a cresol, an ethyl phenol, a butyl phenol, a xylenol, a phenyl phenol, a catechol, resorcinol, a pyrogallol, naphthol, or a bisphenol A. The phenols can be used each alone or as a combination of two or more of them.

Further, aldehydes include, for example, a formaldehyde, a paraformaldehyde, an acetoaldehyde, a propion aldehyde, or a benzaldehyde.

Specific examples of the novolac resin include a methacresol, a paracresol, or a condensation producted of a mixture thereof and formalin. The molecular weight distribution of the novolac resin can be controlled by using means such as separation. Further, a low molecular weight ingredient having a phenolic hydroxyl group such as bisphenol C or bisphenol A may also be mixed with the novolac resin.

The binder is preferably polymers having a weight average molecular weight by of $1 \times 10^3$ to $2 \times 10^5$, more preferably polymer having an average molecular weight of $2 \times 10^3$ to $1 \times 10^5$, and particularly polymer having a average molecular weight of $5 \times 10^3$ to $5 \times 10^4$ measured by GPC and converted into polystyrene.

The content of the binder in the colored curable composition of the invention is preferably 0 to 90% by mass, more preferably, 0 to 70% by mass, and particularly preferably, 0 to 60% by mass, based on the entire solid content in the composition, (Cross-Linking Agent)

In the colored curable composition of the invention, dye according to the invention is used, and the curing reaction of the film proceeds at a higher level compared with that in the existent case, and a film of good curability can be obtained. For the colored curable composition, it is also possible to obtain a film cured at a higher level by supplementarily using a cross-linking agent. The cross-linking agent is useful with a view point of attaining higher resolution of the colored curable composition of the invention.

The cross-linking agent available in the invention is not particularly restricted, so long as it is able to cure the layer with the cross-linking agent, and examples of the cross-linking agent include (a) epoxy resins, (b) melamine compounds, guanamine compounds, glycoluryl compounds or urea compounds substituted with at least one substituent selected from methylol group, alkoxymethyl group and acyloxymethyl group, and (c) phenol compounds, naphthol compounds or hydroxyanthrathene compounds substituted with at least one substituent selected from methylol group, alkoxymethyl group and acyloxymethyl group. A multifunctional epoxy resins are particularly preferable.

Any resins may be used as the epoxy resin in the (a) so long as the resin comprises epoxy groups and has a cross-linking property. Examples of the epoxy resin include glycidyl group-containing divalent low molecular weight compounds such as bisphenol A diglycidyl ether, ethyleneglycol diglycidyl ether, butanediol diglycidyl ether, hexanediol diglycidyl ether, dihydroxybiphenyl diglycidyl ether, diglycidyl phthalate and N,N-glycidylaniline; glycidyl group-containing trivalent low molecular weight compounds represented by trivalent trimethylolpropane triglycidyl ether, trimethylolphenol triglycidyl ether and tris P-PA triglycidyl ether; glycidyl group-containing tetravalent low molecular weight compounds represented by pentaerythritol tetraglycidyl ether and tetramethylol bisphenol A tetraglycidyl ether; glycidyl group-containing polyvalent low molecular weight compounds such as dipentaerythritol pentaglycidyl ether and dipentaerythritol hexaglycidyl ether; and glycidyl group-containing high molecular weight compounds represented by polyglycidyl (meth)acrylate and 1,2-epoxy-4-(2-oxylanyl) cyclohexane adduct of 2,2-bis(hydroxymethyl)-1-butanol.

The numbers of the methylol groups, alkoxymethyl groups and acyloxymethyl groups substituting the melamine compounds in the (b) above are preferably 2 to 6, and the numbers of the groups above substituting the glycoluryl compounds, guanamine compounds and urea compounds, respectively, are preferably 2 to 4. More preferably, the numbers of the groups substituting the melamine compounds are 5 to 6, and the numbers of the groups substituting the glycoluryl compounds, guanamine compounds and urea compounds, respectively, are 3 to 4.

The melamine compounds, guanamine compounds, glycoluryl compounds and urea compounds are collectively named as the compounds according to (b) (methylol group-containing compounds, alkoxymethyl group-containing compounds or acyloxymethyl group-containing compounds) hereinafter.

The methylol group-containing compounds according to (b) can be obtained by heating the alkoxymethyl group-containing compounds according to (b) in an alcohol in the presence of an acid catalyst such as hydrochloric acid, sulfuric acid, nitric acid and methanesulfonic acid. The acyloxymethyl group-containing compounds according to (b) can be obtained by mixing acyl chloride with the methylol group-containing compounds according to (b) in the presence of a base catalyst.

Specific examples of the compounds according to (b) having the substituents above will be listed below.

Examples of the melamine compound include hexamethylol melamine, hexamethoxymethyl melamine and compounds having 1 to 5 methylol groups of hexamethylol melamine substituted with methoxymethyl groups, or a mixture thereof; and hexamethoxyethyl melamine, hexaacyloxymethyl melamine and compounds having 1 to 5 methylol groups of hexamethylol melamine substituted with acyloxymethyl groups, or a mixture thereof.

Examples of the guanamine compound include tetramethylol guanamine, tetramethoxymethyl guanamine and compounds having 1 to 3 methylol groups of tetramethylol guanamine substituted with methoxymethyl groups, or a mixture thereof; and tetramethoxyethyl guanamine, tetraacyloxymethyl guanamine and compounds having 1 to 3 methylol groups of tetramethylol guanamine substituted with acyloxymethyl groups, or a mixture thereof.

Examples of the glycoluryl compound include tetramethylol glycoluryl, tetramethoxymethyl glycoluryl and compounds having 1 to 3 methylol groups of tetramethylol glycoluryl substituted with methoxymethyl groups, or a mixture thereof; and compounds having 1 to 3 acyloxymethyl groups of tetramethylol glycoluryl substituted with acyloxymethyl groups, or a mixture thereof.

Examples of the urea compound include tetramethylol urea, tetramethoxymethyl urea and compounds having 1 to 3 methylol groups of tetramethylol urea substituted with methoxymethyl groups, or a mixture thereof; and tetramethoxyethyl urea.

The compounds according to (b) may be used alone, or as a combination thereof.

The compounds in the (c), that is, phenol compounds, naphthol compounds or hydroxyanthracene compounds substituted with at least one group selected from the methylol group, alkoxymethyl group and acyloxymethyl group can suppress inter-mixing of the curable resin composition with a overcoat photoresist by forming cross-links by heating as the case of the compounds in the (b), and the strength of the layer is enhanced. These compounds are collectively named as the compounds according to the (c) (methylol group-containing compounds, alkoxymethyl group-containing compounds or acyloxymethyl group-containing compounds).

At least two methylol groups, acyloxymethyl groups or alkoxymethyl groups should be contained per one molecule of the cross-linking agent in the (c). Compounds in which both the 2-position and 4-position of the phenol compound as a frame compound are substituted are preferable from the viewpoint of cross-linking ability by heating and preservation stability. Compounds in which both the ortho-position and para-position relative to the OH group of the naphthol compound or hydroxyanthracene compound as a frame compound are substituted are also preferable. The 3-position or 5-position of the phenol compound may be either substituted or unsubstituted.

Positions except the ortho-position relative to the OH group may be either substituted or unsubstituted in the naphthol compound.

The methylol group-containing compound according to the (c) may be obtained using a compound having a hydrogen atom at the ortho- or para-position (2- or 4-position) relative to the phenolic OH group as a starting material, and by allowing the material to react with formalin in the presence of a base catalyst such as sodium hydroxide, potassium hydroxide, ammonia or tetraalkylammonium hydroxide.

The alkoxymethyl group-containing compound according to the (c) may be obtained by heating the methylol group-containing compound according to the (c) in an alcohol in the presence of an acid catalyst such as hydrochloric acid, sulfuric acid, nitric acid or methanesulfonic acid.

The acyloxymethyl group-containing compound according to the (c) may be obtained by allowing the methylol group-containing compound according to the (c) to react with an acyl chloride in the presence of a base catalyst.

Examples of the frame compound of the cross-linking agent (c) include phenol, naphthol and hydroxyanthracene compounds in which the ortho- or para-position relative to the phenolic OH group is unsubstituted. Examples of the frame compound available include phenol, isomers of cresol, 2,3-xylenol, 2,5-xylenol, 3,4-xylenol, 3,5-xylenol, bisphenols such as bisphenol A, 4,4'-bishydroxybiphenyl, Tris P-PA (manufactured by Honshu Chemical Industry Co., Ltd.), naphthol, dihydroxynaphthalene and 2,7-dihydroxyanthracene.

Specific examples of the phenol compound or naphthol compound as the cross-linking agent (c) include trimethylolphneol, tri(methoxymethyl)phenol, and compounds having 1 to 2 methylol groups of trimethylol phenol substituted with methoxymethyl groups; trimethylol-3-cresol, tri(methoxymethyl)-3-cresol and compounds having 1 to 2 methylol groups of trimethylol-3-cresol substituted with methoxymethyl groups; dimethylcresol such as 2,6-dimethylol-4-cresol, tetramethylol bisphenol A, tetramethoxymethyl bisphenol A and compounds having 1 to 3 methylol groups of tetramethylol bisphenol A substituted with methoxymethyl groups; tetramethylol-4,4'-bishydroxybiphenyl, tetramethoxymethyl-4,4'-bishydroxybiphenyl, hex amethylol compounds of Tris P-PA, hex amethoxymethyl compounds of Tris P-PA, and compounds having 1 to 5 methylol groups of hexamethylol compound of Tris P-PA substituted with methoxymethyl groups; and bishydroxymethyl naphtalnediol.

Examples of the hydroxyanthracene compound include 1,6-dihydroxymethyl-2,7-dihydroxyanthracene.

Examples of the acyloxymethyl group-containing compound include methylol group-containing compounds in which a part or all the methylol groups are substituted with acyloxymethyl groups.

Preferable compounds among the compounds above include trimethylol phenol, bis hydroxymethyl-p-cresol, tetramethylol bisphenol A, and hexamethylol compounds of Tris P-PA (manufactured by Honshu Chemical Industry Co., Ltd.), or phenol compounds in which the methylol groups are substituted with the alkoxymethyl groups, and in which the methylol groups are substituted with both methylol groups and alkoxymethyl groups.

The compounds according to the (c) may be used alone, or as a combination thereof.

The cross-linking agent is not always contained in the curable composition according to the invention. The total content of the cross-linking agent, if any, according to (a) to (c) in the colored curable composition is preferably 1 to 70% by mass, more preferably 5 to 50% by mass, and particularly 7 to 30% by mass, relative to the solid content (mass) of the curable composition, although the content differs depending on the materials used.

(Polymerizable Monomer)

The colored curable composition of the invention can be constituted suitably by using at least one kind of a polymerizable monomer. The polymerizable monomer is included mainly in a case of constituting the colored curable composition as a negative working composition. Further, it can be included further together with a photopolymerization initiator to be described later to the positive type system containing a naphthoquinone diazide compound to be described later, in the case of hardness of the pattern formed is enhanced The polymerizable monomer is useful in attaining higher sensitivity and higher resolution of the colored curable composition of the invention by using it together with the photopolymerization initiator to be described later. The polymerizable monomer will be described below.

The monomer is preferably a compound comprising ethylenic unsaturated groups containing at least one ethylene group capable of addition polymerization and a boiling point of 100° C. or more at normal pressures. Examples of the monomer-containing compounds include monofunctional acrylate and methacrylate such as polyethyleneglycol mono (meth)acrylate, polypropyleneglycol mono(meth)acrylate, phenoxyethyl (meth)acrylate; (meth)acrylate compounds prepared after an addition reaction of ethylene oxide or propylene oxide to polyfunctional alcohols such as polyethyleneglycol di(meth)acrylate, trimethylolethane tri(meth)acrylate, neopentylglycol di(meth)acrylate, pentaerythritol tri(meth)acrylate, pentaerythritol tetra(meth)acrylate, dipentaerythritol penta(meth)acrylate, dipentaerythritol hexa(meth)acrylate, hexanediol (meth)acrylate, trimethylolpropane tri(acryloyloxypropyl)ether, tri(acryloyloxyethyl)isocyanulate, glycerine and trimethylolethane; urethane acrylates described in JP-B Nos. 48-41708 and 50-6034, and JP-A No. 51-37193; polyester acrylates described in JP-A No. 48-64183 and JP-B No. 49-43191 and 52-30490; polyfunctional acrylate and methacrylate of epoxyacrylate as a reaction product of an epoxy resin and (meth)acrylic acid; and mixtures thereof. The compounds described in Nihon Secchaku Kyokai-shi Vol. 20, No. 7, pp. 300-308 as a photocurable monomer and an oligomer are also included in the compounds of the invention.

The content of the polymerizable monomer in the colored curable composition is preferably 0.1 to 90% by mass, more preferably 1.0 to 80% by mass, and particularly 2.0 to 70% by mass, based on the solid content of the composition.

[Radiation-Sensitive Compound]

The colored curable composition of the invention comprises at least one kind selected from the radiation-sensitive compounds. The radiation-sensitive compound is able to effect chemical reactions such as generation of radicals, acids and bases by irradiation of radiation such as UV, deep UV, visible light, infrared light and electron beam. The radiation-sensitive compound is used for making the alkali-soluble binder insoluble by cross-linking, polymerization and decomposition of acidic groups, or for making coating layers insoluble to an alkali developer by inducing polymerization of the polymerizable monomer and oligomer remaining in the coating layer or cross-linking of the cross-linking agent.

The radiation sensitive compound is used in view of attaining higher sensitivity and higher resolution of the colored curable composition of the invention.

The colored curable composition contains the photopolymerization initiator in a case where it is constituted as a negative type, and a naphthoquinone azide compound in a case where it is constituted as a positive type as essential ingredients respectively.

(Photopolymerization Initiator, and that Like.)

The photopolymerization initiator used in a case of constituting a negative working composition is to be described. The photopolymerization initiator is not restricted particularly so long as it can polymerize the polymerizable monomer (monomer having polymerizable group). The photopolymerization initiator is preferably selected with a view point of the characteristic, initiation efficiency, absorption wavelength, availability, cost, and that like. The photopolymerization initiator may also be included further in the positive working composition containing the naphthoquinone diazide compound. In a case of including the photopolymerization initiator in the positive working composition, the curability of the formed pattern can be promoted further.

The photopolymerization initiator includes at least one of an active halogen compound selected from halomethyl oxadiazole compounds and halomethyl-s-triazine compounds, a 3-aryl substituted coumarin compound, a rofin dimmer, a benzophenone compound, an acetophenone compound and derivatives thereof, cyclopentadiene-benzene-iron complexe and salt thereof, and an oxime-based compound, and that like.

The active halogen compound such as halomethyl oxadiazol described above includes 2-halomethyl-5-vinyl-1,3,4-oxadiazole compound, and that like. described in JP-B No. 57-6096, 2-trichloromethyl-5-styryl-1,3,4-oxadiazole, 2-trichloromethyl-5-(p-cyanostyryl)-1,3,4-oxadiazole, 2-trichloromethyl-5-(p-methoxystyryl)-1,3,4-oxadiazole, and that like.

The photopolymerization initiator of the halomethyl-s-triazine compounds described above includes a vinyl halomethyl-s-triazine compound described in JP-B No. 59-1281, 2-(naphtho-1-yl)-4,6-bis-halomethyl-s-triazine compound, and 4-(p-aminophenyl)-2,6-di-halomethyl-s-triazine compound described in JP-A No. 53-133428.

Other specific examples include 2,4-bis(trichloromethyl)-6-p-methoxystyryl-s-triazine, 2,6-bis(trichloromethyl)-4-(3,4-methylenedioxyphenyl)-1,3,5-triazine, 2,6-bis(trichloromethyl)-4-(4-methoxyphenyl)-1,3,5-triazine, 2,4-bis(trichloromethyl)-6-(1-p-dimethylaminophenyl-1,3-butadienyl)-s-triazine, 2-trichloromethyl-4-amino-6-p-methoxystyryl-s-triazine, 2-(naphtho-1-yl)-4,6-bis-trichloromethyl-s-triazine, 2-(4-methoxy-naphtho-1-yl)-4,6-bis-trichloromethyl-s-triazine,
2-(4-ethoxy-naphtho-1-yl)-4,6-bis-trichloromethyl-s-triazine, 2-(4-butoxy-naphtho-1-yl)-4,6-bis-trichloromethyl-s-triazine, 2-[4-(2-methoxyethyl)-naphtho-1-yl]-4,6-bis-trichloromethyl-s-triazine, 2-[4-(2-ethoxyethyl)-naphtho-1-yl]-4,6-bis-trichloromethyl-s-triazine, 2-[4-(2-butoxyethyl)-napho-1-yl]-4,6-bis-trichloromethyl-s-triazine, 2-(2-methoxy-naphtho-1-yl)-4,6-bis-trichloromethyl-s-triazine, 2-(6-methoxy-5-methyl-naphtho-2-yl)-4,6-bis-trichloromehtyl-s-triazine, 2-(6-methoxy-naphtho-2-yl)-4,6-bis-trichloromethyl-s-triazine, 2-(5-methoxy-naphtho-1-yl)-4,6-bis-trichloromethyl-s-triazine, 2-(4,7-dimethoxy-naphtho-1-yl)-4,6-bis-trichloromethyl-s-triazine, 2-(6-ethoxy-naphtho-2-yl)-4,6-bis-trichloromethyl-s-triazine, 2-(4,5-dimethoxy-naphtho-1-yl)-4,6-bis-trichloromethyl-s-triazine, 4-[p-N,N-di(ethoxycarbonylmethyl)aminophenly]-2,6-di(trichloromethyl)-s-triazine, 4-[o-methyl-p-N,N-di(ethoxycarbonylmethyl)aminophenyl]-2,6-di(trichloromethyl)-s-triazine, 4-[p-N,N-di(chloroethyl)aminophenyl]-2,6-di(trichloromethyl)-s-triazine, 4-[o-methyl-p-N,N-di(chloroethyl)aminophenyl]-2,6-di(trichloroethyl)-s-triazine, 4-(p-N-chloroethylaminophenly)-2,6-di(trichloromethyl)-s-triazine, 4-(p-N-ethoxycarbonylmethylaminophenol)-2,6-di(trichloromethyl)-s-triazine, 4-[p-N,N-di(phenyl)aminophenyl]-2,6-di(trichloromethyl)-s-triazine, 4-(p-N-chloroethylcarbonylaminophenyl)-2,6-di(trichloromethyl)-s-triazine, 4-[p-N-(p-mehtoxyphenyl)carmonylaminophenyl]-2,6-di(trichloromethyl)-s-triazine, 4-[m-N,N-di(ethoxycarbonylmethyl)aminophenyl]-2,6-di(trichloromethyl)-s-triazine, 4-[m-bromo-p-N,N-di(ethoxycarbonylmethyl)aminophenyl]-2,6-di(trichloromethyl)-s-triazine,
4-[m-chloro-p-N,N-di(ethoxycarbonylmethyl)aminophenyl]-2,6-di(trichloromethyl)-s-triazine, 4-[m-fluoro-p-N,N-di(ethoxycarbonylmethyl)aminophenyl]-2,6-di(trichloromethyl)-s-triazine, 4-[o-bromo-p-N,N-di(ethoxycarbonylmethyl)aminophenyl]-2,6-di(trichloromethyl)-s-triazine, 4-[o-chloro-p-N,N-di(ethoxycarbonylmethyl)aminophenyl]-2,6-di(trichloromethyl)-s-triazine, 4-[o-fluoro-p-N,N-di(ethoxycarbonylmethyl)aminophenyl]-2,6-di(trichloromethyl)-s-triazine, 4-[o-bromo-p-N,N-di(chloroethyl)aminophenyl]-2,6-di(trichloromethyl)-s-triazine, 4-[o-chloro-p-N,N-di(chloroethyl)aminophenyl]-2,6-di(trichloromethyl)-s-triazine, 4-[o-fluoro-p-N,N-di (chloroethyl)aminohenyl]-2,6-di(trichloromethyl)-s-triazine, 4-[m-bromo-p-N,N-di(chloroethyl)aminohenyl]-2,6-di(trichloromethyl)-s-triazine, 4-[m-chloro-p-N,N-di(chloroethyl)aminophenyl]-2,6-di(trichloromethyl)-s-triazine, 4-[m-fluoro-p-N,N-di(chloroethyl)aminophenyl]-2,6-di(trichloromethyl)-s-triazine, 4-(m-bromo-p-N-ethoxycarbonylmethylaminophenyl)-2,6-di(trichloromethyl)-s-triazine, 4-(m-chloro-p-N-ethoxycarbonylmethyl-aminophenyl)-2,6-di(trichloromethyl)-s-triazine, 4-(m-fluoro-p-N-ethoxycarbonylmethylaminophenyl)-2,6-di(trichloromethyl)-s-triazine, 4-(o-bromo-p-N-ethoxycarbonylmethylaminophenyl)-2,6-di(trichloromethyl)-s-triazine, 4-(o-chloro-p-N-ethoxycarbonylmethylaminophenyl)-2,6-di(trichloromethyl)-s-triazine, 4-(o-fluoro-p-N-ethoxycarbonylmethylaminophenyl)-2,6-di(trichloromethyl)-s-triazine, 4-(m-bromo-p-N-chloroethylaminophenyl)-2,6-di(trichloromethyl)-s-triazine, 4-(m-chloro-p-N-chloroethylaminophenyl)-2,6-di(trichloromethyl)-s-triazine, 4-(m-fluoro-p-N-chloroethylaminophenyl)-2,6-di(trichloromethyl)-s-triazine, 4-(o-bromo-p-N-chloroethylaminophenyl)-2,6-di(trichloromethyl)-s-triazine, 4-(o-chloro-p-N-chloroethylaminophenyl)-2,6-di(trichloromethyl)-s-triazine, and 4-(o-fluoro-p-N-chloroethylaminophenyl)-2,6-di(trichloromethyl)-s-triazine.

In addition, TAZ-107, TAZ-110, TAZ-104, TAZ-109, TAZ-140, TAZ-204, TAZ-113, and TAZ-123 as TAZ series manufactured by Midori Kagaku Co., Ltd., T-OMS, T-BMP, T-R, T-B, as T-series manufactured by Panchim Co., Ltd., Irgacure 369, Irgacure 784, Irgacure 651, Irgacure 184, Irgacure 500, Irgacure 1000, Irgacure 149, Irgacure 819, Irgacure 261, as the Irgacure series, Darocure 1173 as the Darocure series, manufactured by Ciba Speciality Chemicals Co., 4,4'-bis(diethylamino)-benzophenone, 2-(O-benzoyloxime)-1-[4-(phenylthio)phenyl]-1,2-octanedione, 2-benzyl-2-dimethylamino-4-morpholinobutyrophenone, 2,2-dimethoxy-2-phenylacetophenone, 2-(o-chlorophenyl)-4,5-diphenyl imidazolyl dimer, 2-(o-fluorophenyl)-4,5-diphenyl imidazolyl dimer, 2-(o-methoxyphenyl)-4,5-diphenyl imidazolyl dimer, 2-(p-methoxyphenyl)-4,5-diphenyl imidazolyl dimer, 2-(p-dimethoxyphenyl)-4,5-diphenyl imidazolyl dimer, 2-(2,4-dimethoxyphenyl)-4,5-diphenyl imidazolyl dimer, 2-(p-methylmercaptophenyl)-4,5-diphenyl imidazolyl dimer, and benzoin isopropyl ether can also be used usefully.

Known Photopolymerization initiators other than those described above may be used together with the colored curable composition of the invention. Examples of them include vicinal polyketolaldonyl compounds described in U.S. Pat. No. 2,367,660, α-carbonyl compounds described in U.S. Pat. Nos. 2,367,661 and 2,367,670, acyloin ether compounds described in U.S. Pat. No. 2,448,828, aromatic acyloin compounds substituted with α-carbohydrates described in U.S. Pat. No. 2,722,512, polynuclear quinone compounds described in U.S. Pat. Nos. 3,046,127 and 2,951,758, combinations of trially imidazole dimer and p-aminophenyl ketone described in U.S. Pat. No. 3,549,367, and bemzothiazole compounds/trihalomethyl-s-triazine compounds described in JP-B No. 51-48516.

The content of the photopolymerization initiator in the colored curable composition is preferably 0.01 to 50% by mass, more preferably, 1 to 30% by mass, and particular preferably, 1 to 20 mass %, based on the solid content (mass) of the polymerizable monomer. In a case where the content is within the range described above, the polymerization proceeds and the film strength can be ensured.

Sensitizers and light stabilizers may be used together with these photopolymerization initiators. Specific examples of them include benzoin, benzoin methylether, 9-fluorenone, 2-chloro-9-fluorenone, 2-methyl-9-fluorenone, 9-anthrone, 2-bromo-9-anthrone, 2-ethyl-9-anthrone, 9,10-anthraqunone, 2-ethyl-9,10-anthraquinone, 2-t-butyl-9,10-anthraquinone, 2,6-dichloro-9,10-anthraquinone, xanthone, 2-methylxanthone, 2-methoxyxanthone, thioxanthone, 2,4-diethylthioxanthone, acrydone, 10-butyl-2-chloroacrydone, benzyl, banzalacetone, p-(dimethylamino)phenylstyrylketone, p-(dimethylamino)phanyl-p-methylstyrrylketone, dibenzophenone, p-(dimethylamino)benzophenone (or Michler's ketone), p-(diethylamino)benzophenone, benzoanthrone, and benzothiazole compounds described in JP-B No. 51-48516, Tinuvin 1130 and Tinuvin 400.

A heat polymerization inhibitor is preferably added on addition to the additives above, and preferable examples thereof include hydroquinone, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol) and 2-mercaptobenzimidazole.

(Naphthoquinone Azide Compound)

Then, the naphtoquinone azide compound used in a case of constituting the colored curable composition as a positive working composition is to be described. The naphthoquinone diazide compound is a compound having at least one o-quinone diazide group. Examples thereof include an o-naphtnoquinone diazide-5-sulfonate ester, an o-naphtoquinone diazide-5-sulfonic amide, an o-naphthoquinone diazide-4-sulfonate ester, and an o-naphtnoquinone diazide-4-sulfonic amide. The esters and the amide compounds described above can be produced, for example, by a known method using a phenol compound represented by formula (I) in JP-A Nos. 2-84650 and 3-49437.

Further, in a case of constituting the colored curable composition as the positive working composition, the binder and the cross-linking agent are usually dissolved preferably at a ratio of about 2 to 50% by mass and 2 to 30% by mass in the organic solvent respectively. Further, the content of each of the naphthoquinone diazide compound and the dye is usually at a ratio preferably of about 2 to 30% by mass and 2 to 50% by mass respectively, based on the mass of the solution in which the binder and the cross-linking agent are dissolved.

[Solvent]

The colored curable composition of the invention usually requires an solvent for preparation. The solvent is not particularly restricted provided that it satisfies solubility of each component and coating ability of the colored curable composition. The organic solvent is preferably selected considering solubility of the dye and alkali-soluble binder, coating ability and safety.

Examples of the preferable organic solvent include esters such as ethyl acetate, n-butyl acetate, isobutyl acetate, amyl formate, isoamyl acetate, butyl propionate, isopropyl butylate, ethyl butylate, butyl butylate, alkyl esters, methyl lactate, ethyl lactate, methyl oxylactate, ethyl oxylactate, butyl oxylactate, methyl methoxyacetate, ethyl methoxyacetate, butyl methoxyacetate, methyl ethoxyacetate, ethyl ethoxyacetate; 3-oxypropionic acid alkyl esters such as methyl 3-oxypropionate and ethyl 3-oxypropionate including methyl 3-methoxypropionate, ethyl 3-methoxypropionate, methyl 3-ethoxypropionate and ethyl 3-ethoxypropionate; 2-oxypropionic acid alkyl esters such as methyl 2-oxypropionate, ethyl 2-oxypropionate and propyl 2-oxypropionate including methyl 2-methoxypropyonate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, and ethyl 2-ethoxy-2-methylpropionate; methylpyruvate, ethyl pyruvate, propyl pyruvate, methyl acetoacetate, ethyl acetoacetate, methyl 2-oxobutanate and ethyl 2-oxobutanate;

ethers such as diethyleneglycol dimethylether, tetrahydrofuran, ethyleneglycol monomethylether, ethyleneglycol monoethylether, methyl cellosolve acetate, ethyl cellosolve acetate, diethyleneglycol monomethylether, diethyleneglycol monoethylether, diethyleneglycol monobutylether, propyleneglycol methyl ether, propyleneglycol methylether acetate, propyleneglycol ethylether acetate, and propyleneglycol propylether acetate;

ketones such as methylethyl ketone, cyclohexanone, 2-heptanone and 3-heptanone; and aromatic hydrocarbons such as toluene and xylene.

Among them, methyl 3-ethoxypropionate, ethyl 3-ethoxypropionate, ethyl cellosolve acetate, ethyl lactate, diethyleneglycol dimethylether, butyl acetate, methyl 3-methoxypropionate, 2-heptanone, cyclohexanone, cyclopentanone, ethylcarbitol acetate, butylcarbitol acetate, propyleneglycol methylether and propyleneglycol methylether acetate are more preferable.

[Additives]

Various additives such as fillers, polymer compounds other than those above, surfactants, adherence enhancing agents, antioxidants, ultraviolet absorbing agents and antiflocculants may be added, if necessary, to the colored curable composition of the invention.

Specific examples of the additives include fillers such as glass and alumina; polymer compounds other than the binding resins such as polyvinyl alcohol, polyacrylic acid, polyethyleneglycol monoalkylether and polyfluoroalkyl acrylate; surfactants such as nonionic, cationic and anionic surfactants; adherence enhancing agents such as vinyl trimethoxy silane, vinyl triethoxy silane, vinyl tris(2-methoxyethoxy)silane, N-(2-aminoethyl)-3-aminopropylmethylmetoxy silane, N-(2-aminoethyl)-3-aminopropyltrimethoxy silane, 3-aminopropyltriethoxy silane, 3-glycidoxypropyl trimethoxy silane, 3-glycidoxypropyl methyldimethoxy silane, 2-(3,4-epoxycyclohexyl)ethyl trimethoxy silane, 3-chloropropylmethyl dimethoxy silane, 3-chloropropyl trimethoxy silane, 3-methacryloxypropyl trimethoxy silane, and 3-mercaptopropyl trimethoxy silane; antioxidants such as 2,2-thiobis(4-methyl-6-t-butylphenol) and 2,6-di-t-butylphenol; ultraviolet absorbing agents such as 2-(3-t-butyl-5-methyl-2-hydroxydiphenyl)-5-chlorobenzotriazole and alkoxybenzophenone; and antiflocculants such as sodium polyacrylate.

Organic carboxylic acids, preferably low molecular weight organic carboxylic acids with a molecular weight of 1000 or less may be added for enhancing alkali solubility of non-cured parts to further improving development ability of the colored curable composition of the invention.

Examples of the organic carboxylic acid include aliphatic monocarboxylic acids such as formic acid, acetic acid, propionic acid, butyric acid, valeric acid, pivalic acid, caproic acid, diethylacetic acid, enanthic acid and caprylic acid; aliphatic dicarboxylic acids such as oxalic acid, malonic acid, succinic acid, glutaric acid, adipic acid, pimelic acid, suberic acid, azelaic acid, sebacic acid, brassylic acid, methylmalonic acid, ethylmalonic acid, dimetylmalonic acid, methylsuccinic acid, tetramethylsuccinic acid and citraconic acid; aliphatic tricarboxylic acid such as tricarballylic acid, aconitic acid and camphoronic acid; aromatic monocarboxylic acid such as benzoic acid, toluic acid, cuminic acid, hemelitic acid and mesitylenic acid; aromatic polycarboxylic acid such as phthalic acid, isophthalic acid, terephthalic acid, trimellitic acid, trimesic acid, mellophanic acid and pyromellitic acid; and other carboxylic acid such as phenylacetic acid, hydroatropic acid, hydrocinnamic acid, mandelic acid, phenylsuccinic acid, atropic acid, cinnamic acid, methyl cinnamate, benzyl cinnamate, cinnamilydenic acid, cumalic acid and umbelic acid.

The colored curable composition of the invention can be utilized suitably as a color filter for recording and reproducing color images used for solid image pick-up elements such as CCD or CMOS, or display such as LCD or PDP, or that like, or for the colored curable composition for manufacturing such color filters.

<Color Filter and Method of Producing Thereof>

Then, the color filter of the invention is to be described specifically by way of method of producing thereof.

The color filter of the invention can be produced by any method so long as it is in a form constituted with at least one of the dye of the invention, that is, the dye monomer represented by the formula (P). For example, the color filter of the invention can be produced suitably by preparing a colored curable composition containing the dye of the invention, coating the prepared colored curable composition onto a support, exposing through a given mask pattern, and developing to remove not-cured portion (not-exposed portion), for example, in a case of the negative working composition thereby forming a pattern image (arbitrarily repeating by the desired number of hues constituting the color filter so as to provide a desired hue).

In the producing method of the color filter of the invention, the colored curable composition of the invention described above is used. The color filter of the invention can be produced most suitable by the following image forming process. That is, a radiation sensitive composition layer is formed by using the colored curable composition of the invention described above, coating the colored curable composition onto a support by a coating method such as rotary coating, cast coating, or roll coating. The layer is exposed through a given mask pattern and developed with a developer to form a negative type or positive type colored pattern. In this case, a curing process of curing the formed colored pattern by heating and/or exposure can be provided as required. As the light or radiation rays used in this case, UV-rays such as g-rays, h-rays, i-rays are particularly preferred. Further, in a case where the colored curable composition is constituted as the positive type, a process of post-baking the colored pattern after the image forming process can be provided.

The negative-type color filter comprising desired hues may be prepared by repeating the plural times of the image forming steps (and curing step, if necessary) corresponding to the number of the hues. The positive-type color filter comprising desired hues may be prepared by repeating the plural times of the image forming steps and post-baking steps corresponding to the number of the hues.

Examples of the support include a soda glass, Pyrex (R) glass and quartz glass, which are used for a liquid crystal displays those on which a transparent conductive film is adhered, and the substrate of photoelectric conversion elements used for the imaging element such as, for example, a silicone substrate and complementary metal oxide film semiconductor (CMOS). Black stripes for isolating each pixel may be formed on these supports.

An undercoat layer may be provided on the support for improving adhesive property to the upper layers, for preventing diffusion of substances, and for planarizing the surface of the support.

As the developer used for the producing method of the color filter of the invention, any developer may be used so long as it can develop dissolving portions of the colored curable composition of the invention to be removed by development (for example, not cured portion in a case of the negative working composition), and on other hand, can not dissolve the cured portion forming the filter. Specifically, a combination of various organic solvents or an aqueous alkaline solution can be used.

The organic solvent described above includes those solvents used for the preparation of the composition of the invention described previously.

As the aqueous alkali solution, an aqueous alkali solution which dissolved an alkali compound in the concentration of 0.001 to 10% by weight (preferably 0.01 to 1% by weight) is preferred. Examples of the alkali compound include sodium hydroxide, potassium hydroxide, sodium carbonate, sodium silicate, sodium methanesilicate, ammonia water, ethylamine, diethylamine, dimethylethanolamine, tetramethylammonium hydroxide, tetraethylammonium hydroxide, choline, pyrrole, piperidine, and 1,8-diazabicyclo-[5.4.0]-7-undecene. When a developing solution prepared from such an aqueous alkali solution was used, generally after the development, the developing solution is washed with water.

The color filter of the invention can be used for the liquid crystal display (LCD) and solid state image pick-up element (for example CCD and CMOS). The color filter is suitable for a high-definition CCD element and CMOS having 1,000,000 pixels or more. The color filter of the invention may be used by disposing between the light-receiving part of the pixels constituting the CCD and micro-lenses for converging the light.

EXAMPLES

Hereinbelow, the invention will be described in detail by way of Examples. However, the invention is not limited to these Examples as long as the scope of the invention is not impaired. Unless otherwise specified, the "part" means "parts by mass".

Example 1

1) Preparation of Resist Solution A (Negative Type)

The compounds in the following composition were mixed and dissolved to prepare a resist solution A.

Propylene glycol monomethyl ether acetate (PGMEA): 5.2 parts

Cyclohexanone: 52.6 parts

Binder: 30.5 parts

[41% cyclohexanone solution of benzyl methacrylate/methacrylic acid/2-hydroxyethyl methacrylate copolymer (molar ratio=60:20:20)]

Dipentaerythritol hexaacrylate: 10.2 parts

Polymerization inhibitor (p-methoxyphenol): 0.006 part

Fluorine-based surfactant: 0.80 part (trade name of products: F-475, manufactured by DAINIPPON INK AND CHEMICALS, INC.)

Photopolymerization initiator TAZ-107 (manufactured by Midori Kagaku Co., Ltd.): 0.58 part 2) Production of Undercoat Layer-Bearing Glass Support A glass support (Corning 1737) was ultrasonically washed with an aqueous solution of 0.5% NaOH, and then washed with water and dehydration bake (200° C./30 minutes) was carried out. Next, on the glass support, which was washed, the resist solution A obtained in 1) was coated in the thickness of 2 μm using a spin coater and dried under heat at 220° C. for 1 hour to form a cured film (undercoat layer).

3) Preparation of Resist Solution B (Negative Type)

The compounds in the following composition were mixed and dissolved to prepare a resist solution B.

Propylene glycol monomethyl ether acetate (PGMEA): 5.2 parts

Cyclohexanone: 64.6 parts

Binder: 10.2 parts

[41% cyclohexanone solution of benzyl methacrylate/methacrylic acid/2-hydroxyethyl methacrylate copolymer (molar ratio=60:20:20)]

Dipentaerythritol hexaacrylate: 18.5 parts

Polymerization inhibitor (p-methoxyphenol): 0.006 part

Fluorine-based surfactant: 0.80 part (trade name of products: F-475, manufactured by DAINIPPON INK AND CHEMICALS, INC.)

Photopolymerization initiator TAZ-107 (manufactured by Midori Kagaku Co., Ltd.): 0.58 part 4) Preparation of Dye Resist Solution (Colored Curable Composition "Negative Type")

9.4 g of the resist solution B obtained in 3) above and 1.20 g of an exemplified compound P-1 described above, i.e., the dye according to the invention (copolymer of a dye monomer represented by the formula (P) and the colorless monomer having an ethylenic bond) were mixed and dissolved to prepare a dye resist solution (negative working colored curable composition solution).

5) Exposure and Development of Resist (Image Formation)

The dye resist solution obtained in 4) above was coated in the thickness of 1.0 μm on the undercoat layer of the glass support with the undercoat layer obtained in 2) above by using a spin coater and pre-baked at 100° C. for 120 sec.

Then, the coated film was irradiated with light having a wavelength of 365 nm through a mask with linewidth of 20 μm in the exposure amount of 500 mJ/cm$^2$ by using an exposure apparatus. After exposure, the coated film was developed by using a developer CD-2000 (manufactured by FUJI FILM Electronic Materials Co., Ltd.) under the condition of 25° C. for 40 seconds. Then, after rinsing with running water for 30 seconds, it was spray-dried. Then, post-baking was carried out at 200° C. for 15 minutes.

As described above, a suitable pattern as a yellow color constituting the color filter was obtained.

6) Evaluation

The stability over time of the dye resist solution prepared as described above and the thermal resistance, the light-fastness, and the solvent resistance of the coated film on the glass support by using the dye resist solution were evaluated as described below. The result of evaluation is shown in the following Table 5.

[Stability Over Time]

After storing the dye resist solution at room temperature for one month, the degree of precipitates of foreign matters in the solution was evaluated by visual inspections in accordance with the following judging criterion.

—Judging criterion—

A: precipitates were not observed.

B: precipitates were observed slightly.

C: precipitates were observed.

[Thermal Resistance]

The glass support coated with the dye resist solution was placed on a hot plate at 200° C. so as to be brought into contact with the surface of the support and heated for one hour. Then, the color difference (ΔEab value) before and after heating was measured by a color meter (MCPD-1000, manufactured by Otsuka Denshi Co.) to obtain an index for evaluating the thermal resistance. By using the index, the evaluation was made in accordance with the following judging criterion. Smaller ΔEab value shows better thermal resistance.

—Judging criterion—
A: ΔEab value<5
B: 5≦ΔEab value≦10
C: ΔEab>10

[Light-Fastness]

The glass support coated with the dye resist solution was irradiated with a xenon lamp at 50,000 lux for 20 hours (corresponding to 1,000,000 lux·h). Then, the color difference (ΔEab value) before and after the irradiation was measured to obtain an index for evaluating the light-fastness. Evaluation was made by the index in accordance with the following judging criterion. Smaller ΔEab value shows better light-fastness.

—Judging Criterion—
A: Δab value<3
B: 3≦ΔEab value≦10
C: ΔEab>10

[Solvent Resistance]

Spectroscopic characteristics for each kind of coating films after post-baking obtained in 5) above were measured (spectrum A). The resist solution A obtained in 1) above was coated on the coating film to a film thickness of 1 μm and pre-baking was applied. Then, this was developed by using a developer CD-2000 (manufactured by Fuji film Electronics Materials Co.) under the conditions of 23° C. for 120 seconds to measure the spectroscopic characteristics again (spectrum B). The dye residual ratios were calculated at the difference for the spectrum A and B and evaluations were made by the dye residual ratio. The obtained values are better as the value approaches 100%.

Examples 2 to 10

In the "4) Preparation of the dye resist solution" in Example 1, a pattern was formed in the same manner as in Example 1 except for changing the dye, and the resist solution B of the invention as shown in the following Table 5 (at equal mass). Further, evaluations similar to the above were conducted. The evaluation results are shown in the following Table 5.

The resist solution C in the table 5 is as described below.
The following components were mixed and dissolved to prepare a resist solution C (negative type).
Propylene glycol monomethyl ether acetate (PGMEA): 5.20 parts
Cyclohexanone: 52.6 parts
Dipentaerythritol hexaacrylate: 20.2 parts
Polymerization inhibitor (p-methoxyphenol): 0.006 part
Fluorine-based surfactant: 0.80 part
(trade name of products: F-475, manufactured by DAINIPPON INK AND CHEMICALS, INC.)
Photopolymerization initiator TAZ-107 (manufactured by Midori Kagaku Co., Ltd.): 0.68 part Comparative Examples 1 to 2

In the "4) Preparation of the dye resist solution" in Example 1, a pattern was formed in the same manner as in Example 1 except for changing the dye according to the invention to the following Comparative dye 1 (Comparative Example 1) or Comparative dye 2 (Comparative Example 2) (at equal mass). Further, evaluations similar to the above were conducted. The evaluation results are as shown in the following Table 5.

TABLE 5

| No. | Dye | Resist solution | Stability over time | Thermal resistance | Light-fastness | Solvent resistance |
|---|---|---|---|---|---|---|
| Example 1 | P-1 | B | A | A | A | 99% |
| Example 2 | P-8 | C | A | A | A | 98% |
| Example 3 | P-6 | C | A | A | A | 96% |
| Example 4 | P-12 | B | A | A | A | 98% |
| Example 5 | P-16 | B | A | A | A | 96% |
| Example 6 | P-17 | B | A | A | A | 95% |
| Example 7 | P-36 | C | A | A | A | 96% |
| Example 8 | P-45 | B | B | A | A | 95% |
| Example 9 | P-51 | B | A | B | B | 93% |
| Example 10 | P-62 | C | A | A | A | 94% |
| Comp. Example 1 | Comp. pigment 1 | B | C | C | C | 45% |
| Comp. Example 2 | Comp. pigment 2 | B | B | A | B | 63% |

As shown in Table 5, in the examples using the dyes of the invention, each of the dye resist solutions prepared in a solution form (colored curable composition) was excellent as the stability over time compared with the comparative examples using other dyes than the dyes of the invention. In addition, the patterns formed by using the colored curable compositions of the examples showed thermal resistance, light-fastness, and the solvent resistance.

(Comparative Dye 1)
C. I. Solvent Yellow 162

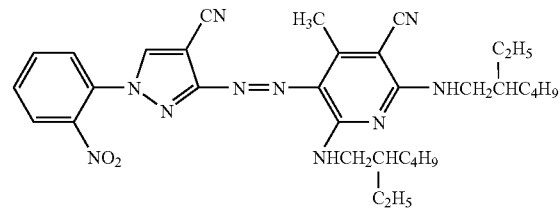

(Comparative dye 2)

Example 11

—Preparation of Colored Curable Composition (Positive Type)—

The following composition was mixed and dissolved to prepare a colored curable composition (positive type) as a solution.
Ethyl lactate (EL): 30 parts
The following resin P-1: 3.0 parts
The following naphthoquinonediazide compound N-1: 1.8 parts
Hexamethoxymethylolated melamine (cross-linking agent): 0.6 part
TAZ-107 (photo acid generator manufactured by Midori Kagaku Co., Ltd.): 1.2 parts
F-475 (Fluorine-based surfactant manufactured by DAINIPPON INK AND CHEMICALS, INC.): 0.0005 part
Exemplified compound (P-1) of the dye according to the invention: 1.5 parts —Synthesis of Resin P-1—

70.0 g of benzyl methacrylate, 13.0 g of methacrylic acid, 17.0 g of 2-hydroxyethyl methacrylate, and 600 g of 2-methoxypropanol were charged in a three-necked flask. Then, a stirring device, a reflux condenser tube and a thermometer were attached to the three-necked flask and a catalytic amount of the polymerization initiator V-65 (manufactured by Wako Pure Chemical Industries, Ltd.) was added under a nitrogen stream at 65° C. and the mixture was stirred for 10 hours. The resultant resin solution was added dropwise into 20 L of ion exchanged water while stirring vigorously and white powder was obtained. The white powder was vacuum-dried at 40° C. for 24 hours, to obtain 145 g of the resin PX. When the molecular weight was measured by GPC, the weight average molecular weight Mw was 28,000, and the number average molecular weight Mn was 11,000.

—Synthesis of naphthoquinone diazide compound N-1—

42.45 g of Tris P-PA (manufactured by Honshu Chemical Industry Co.), 61.80 g of o-naphthoquinone diazide-5-sulfonyl chloride, and 300 ml of acetone were charged in a three necked flask, and 24.44 g of triethylamine was added dropwise at room temperature for one hour into the three necked flask. After completion of dropping, stirring was further conducted for 2 hours. Then, the reaction solution was poured into a large amount of water while stirring. The precipitated naphthoquinone diazide sulfonate ester was collected by suction filtration and vacuum-dried at 40° C. for 24 hours. As described above, a photosensitive naphthoquinone diazide compound N-1 was obtained.

—Exposure and Development of Colored Curable Composition (Image Formation)—

A glass support with an undercoat layer was prepared in the same manner as in Example 1, and the colored curable composition prepared as described above was coated on the glass support having the undercoat layer, and coated film is pre-baked, irradiated with light, developed, rinsed, and spray-dried in the same manner as in Example 1, and a pattern was obtained. Then, the pattern was heated at 80° C. for 5 minutes (post-baked). The formed cyan pattern showed an excellent rectangular profile.

Subsequently, the stability over time of the dye resist solution prepared as described above, and the thermal resistance and the light-fastness of the coating film coated on the glass support by using the dye resist solution were evaluated in the same manner as in Example 1. As a result, any of the stability over time, the light-fastness and the thermal resistance in the same manner was excellent as in the case of the negative type.

Examples 12 to 21

A coating film was formed by coating on a silicon wafer substrate by conducting the processes identical to those in Examples 1 to 10 except for changing the glass support in Examples 1 to 10 to a silicon wafer substrate. Then, a square pattern of 2 μm was exposed by using an i-ray reduction projection exposure device at an exposure amount of 500 mJ/cm². Then, the coating film was developed by using a developer formed by diluting developer CD-2000 (manufactured by FUJI FILM Electronic Materials Co., Ltd.) to 60%, at 23° C. for 60 seconds. Then, after rinsing with running water for 30 seconds, the coating film was spray-dried. With the procedures described above, a pattern (color filter for CCD) having a substantially rectangular cross-section of the square and having a good profile was obtained.

According to the invention, a colored curable composition having a good color hue and high transmittance characteristic, and having a high light-fastness and thermal resistance, and excellent stability over time and the solvent resistance can be provided.

Further, according to the invention, a color filter of a good color hue, a high transmission characteristic, and an excellent light-fastness and thermal resistance, and a method of producing thereof can be provided.

The present invention includes the following embodiment.

(1) A colored curable composition comprising a polymer dye in which the polymer dye is one or more members selected from the group consisting of a copolymer including at least one of a dye monomer represented by formula (P) and a colorless monomer having at least one ethylenic double bond, and a polymer derived from the dye monomer represented by formula (P),

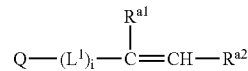

Formula (P)

wherein in formula (P): $R^{a1}$ and $R^{a2}$ each independently represents a hydrogen atom, an aliphatic group, an aryl group, or a heterocyclic group; $L^1$ represents any one of the following (L-1), (L-2), (L-3), or (L-4); i represents 0 or 1; and Q represents a dye residue obtained by removing a hydrogen atom from an arbitrary one of possible position(s) on a dye represented by formula (1),

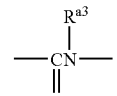

(L-1)

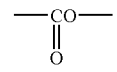

(L-2)

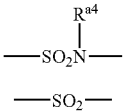

(L-3)

(L-4)

wherein in (L-1) to (L-4): $R^{a3}$ and $R^{a4}$ each independently represents a hydrogen atom, an aliphatic group, an aryl group, or a heterocyclic group; and the dye residue and the group having an ethylenic double bond may be bonded to either side of (L-1) to (L-4),

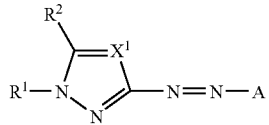

Formula (1)

and wherein in formula (1): $R^1$ represents an aliphatic group, an aryl group, a heterocyclic group, an acyl group, an aliphatic oxycarbonyl group, an aryloxycarbonyl group, a carbamoyl group, an aliphatic sulfonyl group, an arylsulfonyl group, or a sulfamoyl group; $R^2$ represents a hydrogen atom or a substituent; $X^1$ represents —$CR^3$= or a nitrogen atom; $R^3$ represents a hydrogen atom or a substituent; A represents a coupler residue; and when $X^1$ represents $-CR^3=$, $R^1$ and $R^2$ and/or $R^2$ and $R^3$ may join to each other to form a 5- to 7-membered ring.

(2) A color filter comprising a polymer dye in which the polymer dye is one or more members selected from the group consisting of a copolymer including at least one dye monomer represented by formula (P) and a colorless monomer having at least one ethylenic double bond, and a polymer derived from the dye monomer represented by formula (P),

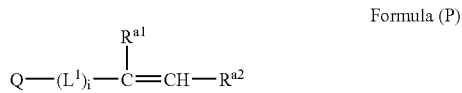

Formula (P)

wherein in formula (P): $R^{a1}$ and $R^{a2}$ each independently represents a hydrogen atom, an aliphatic group, an aryl group, or a heterocyclic group; $L^1$ represents any one of the following (L-1), (L-2), (L-3), or (L-4); i represents 0 or 1; and Q represents a dye residue obtained by removing a hydrogen atom from an arbitrary one of possible position(s) on a dye represented by formula (1),

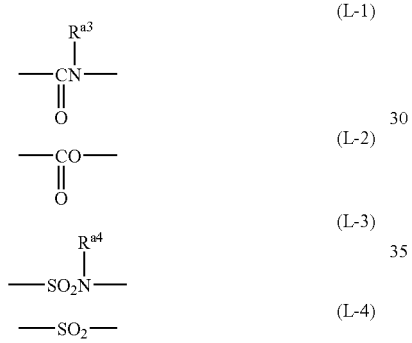

wherein in (L-1) to (L-4): $R^{a3}$ and $R^{a4}$ each independently represents a hydrogen atom, an aliphatic group, an aryl group, or a heterocyclic group; and the dye residue and the group having an ethylenic double bond may be bonded to either side of (L-1) to (L-4),

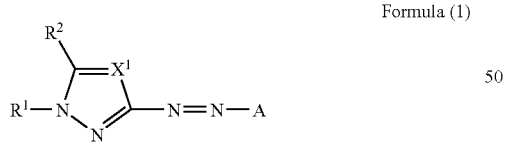

Formula (1)

and wherein in formula (1): $R^1$ represents an aliphatic group, an aryl group, a heterocyclic group, an acyl group, an aliphatic oxycarbonyl group, an aryloxy carbonyl group, a carbamoyl group, an aliphatic sulfonyl group, an arylsulfonyl group, or a sulfamoyl group; $R^2$ represents a hydrogen atom or a substituent; $X^1$ represents $-CR^3=$ or a nitrogen atom; $R^3$ represents a hydrogen atom or a substituent; A represents a coupler residue; and when $X^1$ represents $-CR^3=$, $R^1$ and $R^2$ and/or $R^2$ and $R^3$ may join to each other to form a 5- to 7-membered ring.

(3) A method of producing a color filter comprising:
coating the colored curable composition as described in (1) onto a support; then
exposing through a mask; and
developing to form a pattern image.

(4) A colored curable composition as described in (1), wherein, in formula (P), the aliphatic group is an alkyl group having 1 to 15 carbon atoms in total.

(5) A colored curable composition as described in (1), wherein, in formula (P), $R^{a1}$ is a hydrogen atom or an alkyl group, $R^{a2}$ is a hydrogen atom or an alkyl group, $L^1$ is (L-1) or (L-2), and Q is represented by formula (1).

(6) A colored curable composition as described in (1), wherein, in formula (1), $R^1$ is an aryl group having 6 to 16 carbon atoms in total, or heterocyclic ring having 3 to 18 carbon atoms in total.

(7) A colored curable composition as described in (1), wherein, in formula (1), $R^2$ is a hydrogen atom, an aliphatic group, an aryl group, an acyloxy group, an aliphatic oxy group, or an aliphatic sulfonyloxy group.

(8) A colored curable composition as described in (1), wherein, in formula (1), $X^1$ is selected from $-CR^3=$ or a nitrogen atom, with $R^3$ being an aliphatic oxycarbonyl group, an aliphatic sulfonyl group, or a cyano group.

(9) A colored curable composition as described in (1), wherein, in formula (1), A represents any one of the following (A-1), (A-3), (A-6), or (A-7),

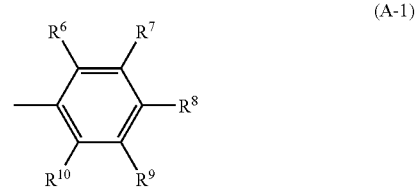

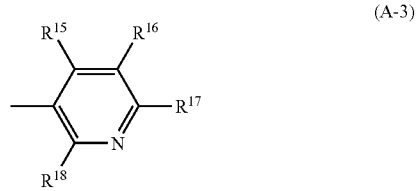

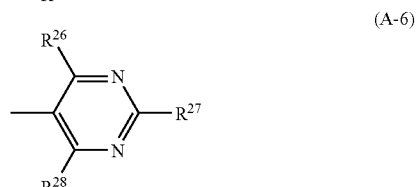

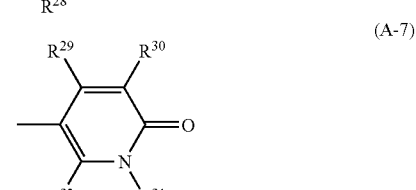

wherein in (A-1) (A-3) (A-6) and (A-7), $R^6$ to $R^{10}$, $R^{15}$ to $R^{18}$, and $R^{26}$ to $R^{32}$ each independently represents a hydrogen atom or a substituent.

(10) A colored curable composition as described in (1), wherein the dye represented by formula (1) is a dye further represented by formula (2),

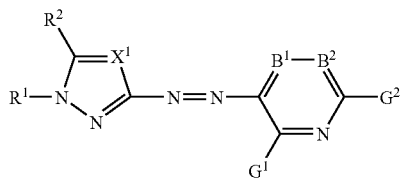

Formula (2)

wherein in formula (2): $R^1$ represents an aliphatic group, an aryl group, a heterocyclic group, an acyl group, an aliphatic oxycarbonyl group, an aryloxy carbonyl group, a carbamoyl group, an aliphatic sulfonyl group, an aryl sulfonyl group, or a sulfamoyl group; $R^2$ represents a hydrogen atom or a substituent; $X^1$ represents $-CR^3=$ or a nitrogen atom; $R^3$ represents a hydrogen atom or a substituent; when $X^1$ represents $-CR^3=$, $R^1$ and $R^2$ and/or $R^2$ and $R^3$ may join to each other to form a 5- or 7-membered ring; $B^1$ represents $-CR^4=$ or a nitrogen atom; $B^2$ represents $-CR^5=$ or a nitrogen atom; $R^4$ and $R^5$ each independently represents a hydrogen atom or a substituent, $G^1$ and $G^2$ each independently represents a hydrogen atom or a substituent.

(11) A colored curable composition as described in (10), wherein, in formula (2), $B^1$ is $-CR^4=$ and $B^2$ is $-CR^5=$ or a nitrogen atom.

(12) A colored curable composition as described in (10), wherein, in formula (2): $R^4$ is an aliphatic group, an aliphatic oxy group, an aromatic oxy group, an aliphatic amino group, or an aryl amino group; $R^5$ is a hydrogen atom, an aliphatic group, or a cyano group.

(13) A colored curable composition as described in (10), wherein, in formula (2), at least one of $G^1$ and $G^2$ is an aliphatic amino group or an aryl amino group.

(14) A colored curable composition as described in (1), wherein the colorless monomer is methyl acrylate, methacrylic acid, crotonic acid, acrylic acid, styrene, t-butyl acryl amide, acryl amide, potassium styrene sulfinate, sodium styrene sulfonate, sodium 2-acrylamide-2-methyl propane sulfonate, or sodium 3-acryloyloxy propane sulfonate.

(15) A colored curable composition as described in (1), wherein the molar ratio of the dye monomer represented by formula (P) to the colorless monomer in the copolymer is 4.5:1 to 1:10.

(16) A colored curable composition as described in (1), wherein in the polymer dye the proportion of the dye portion is 30 to 90% by mass.

(17) A colored curable composition as described in (1), wherein the polymer dye has A hydrophilic group, and the hydrophilic group is a portion of an ethyleneoxy chain, a propyleneoxy chain, a hydroxyl group, a carboxylic acid, a sulfonic acid or a salt thereof.

(18) A colored curable composition as described in (1), which further contains a radiation sensitive compound and a polymerizable monomer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. A colored curable composition comprising a polymer dye in which the polymer dye is one or more members selected from the group consisting of a copolymer including at least one of a dye monomer represented by formula (P) and a colorless monomer having at least one ethylenic double bond, and a polymer derived from the dye monomer represented by formula (P),

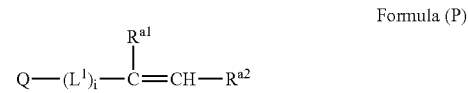

Formula (P)

wherein in formula (P):
$R^{a1}$ and $R^{a2}$ each independently represents a hydrogen atom, an aliphatic group, an aryl group, or a heterocyclic group;
$L^1$ represents any one of the following (L-1), (L-2), (L-3), or (L-4):

(L-1)

(L-2)

(L-3)

(L-4)

wherein in (L-1) to (L-4): $R^{a3}$ and $R^{a4}$ each independently represents a hydrogen atom, an aliphatic group, an aryl group, or a heterocyclic group; and the dye residue and the group having an ethylenic double bond may be bonded to either side of (L-1) to (L-4);
i represents 0 or 1; and
Q represents a dye residue obtained by removing a hydrogen atom from an arbitrary one of possible position(s) on a dye represented by formula (1):

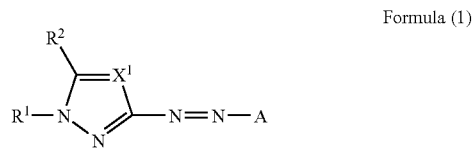

Formula (1)

wherein in formula (1): $R^1$ represents an aliphatic group, an aryl group, a heterocyclic group, an acyl group, an aliphatic oxycarbonyl group, an aryloxycarbonyl group, a carbamoyl group, an aliphatic sulfonyl group, an arylsulfonyl group, or a sulfamoyl group; $R^2$ represents a hydrogen atom or a substituent; $X^1$ represents —$CR^3$= or a nitrogen atom; $R^3$ represents a hydrogen atom or a substituent; A represents a coupler residue; and when $X^1$ represents —$CR^3$=, $R^1$ and $R^2$ and/or $R^2$ and $R^3$ may join to each other to form a 5- to 7-membered ring.

2. A color filter comprising a polymer dye in which the polymer dye is one or more members selected from the group consisting of a copolymer including at least one dye monomer represented by formula (P) and a colorless monomer having at least one ethylenic double bond, and a polymer derived from the dye monomer represented by formula (P),

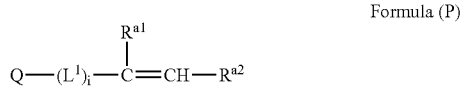

Formula (P)

wherein in formula (P):
$R^{a1}$ and $R^{a2}$ each independently represents a hydrogen atom, an aliphatic group, an aryl group, or a heterocyclic group;
$L^1$ represents any one of the following (L-1), (L-2), (L-3), or (L-4);

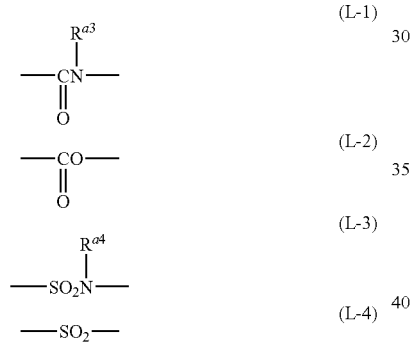

wherein in (L-1) to (L-4): $R^{a3}$ and $R^{a4}$ each independently represents a hydrogen atom, an aliphatic group, an aryl group, or a heterocyclic group; and the dye residue and the group having an ethylenic double bond may be bonded to either side of (L-1) to (L-4)L;
i represents 0 or 1 and
Q represents a dye residue obtained by removing a hydrogen atom from an arbitrary one of possible position(s) on a dye represented by formula (1):

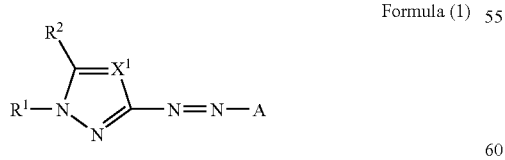

Formula (1)

wherein in formula (1): $R^1$ represents an aliphatic group, an aryl group, a heterocyclic group, an acyl group, an aliphatic oxycarbonyl group, an aryloxy carbonyl group, a carbamoyl group, an aliphatic sulfonyl group, an arylsulfonyl group, or a sulfamoyl group; $R^2$ represents a hydrogen atom or a substituent; $X^1$ represents —$CR^3$= or a nitrogen atom; $R^3$ represents a hydrogen atom or a substituent; A represents a coupler residue; and when $X^1$ represents —$CR^3$=, $R^1$ and $R^2$ and/or $R^2$ and $R^3$ may join to each other to form a 5- to 7-membered ring.

3. A method of producing a color filter comprising:
coating the colored curable composition according to claim 1 onto a support; then
exposing through a mask; and
developing to form a pattern image.

4. A colored curable composition according to claim 1, wherein, in formula (P), the aliphatic group is an alkyl group having 1 to 15 carbon atoms in total.

5. A colored curable composition according to claim 1, wherein, in formula (P), $R^{a1}$ is a hydrogen atom or an alkyl group, $R^{a2}$ is a hydrogen atom or an alkyl group, $L^1$ is (L-1) or (L-2), and Q is represented by formula (1).

6. A colored curable composition according to claim 1, wherein, in formula (1), $R^1$ is an aryl group having 6 to 16 carbon atoms in total, or heterocyclic ring having 3 to 18 carbon atoms in total.

7. A colored curable composition according to claim 1, wherein, in formula (1), $R^2$ is a hydrogen atom, an aliphatic group, an aryl group, an acyloxy group, an aliphatic oxy group, or an aliphatic sulfonyloxy group.

8. A colored curable composition according to claim 1, wherein, in formula (1), $X^1$ is selected from —$CR^3$= or a nitrogen atom, with $R^3$ being an aliphatic oxycarbonyl group, an aliphatic sulfonyl group, or a cyano group.

9. A colored curable composition according to claim 1, wherein, in formula (1), A represents any one of the following (A-1), (A-3), (A-6), or (A-7),

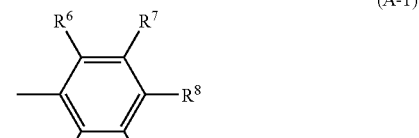

(A-1)

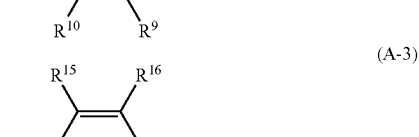

(A-3)

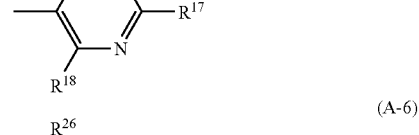

(A-6)

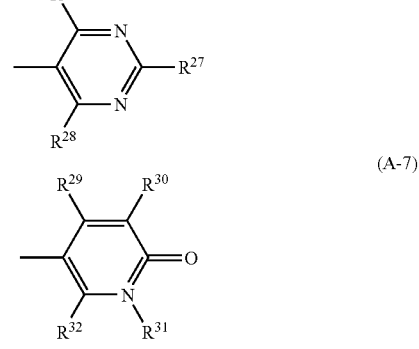

(A-7)

wherein in (A-1), (A-3), (A-6), and (A-7), $R^6$ to $R^{10}$, $R^{15}$ to $R^{18}$ and $R^{26}$ to $R^{32}$ each independently represents a hydrogen atom or a substituent.

10. A colored curable composition according to claim 1, wherein the dye represented by formula (1) is a dye further represented by formula (2),

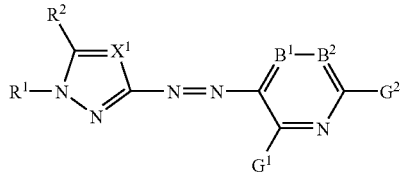

Formula (2)

wherein in formula (2): $R^1$ represents an aliphatic group, an aryl group, a heterocyclic group, an acyl group, an aliphatic oxycarbonyl group, an aryloxy carbonyl group, a carbamoyl group, an aliphatic sulfonyl group, an aryl sulfonyl group, or a sulfamoyl group; R represents a hydrogen atom or a substituent; $X^1$ represents $-CR^3=$ or a nitrogen atom; $R^3$ represents a hydrogen atom or a substituent; when $X^1$ represents $-CR^3=$, $R^1$ and $R^2$ and/or $R^2$ and $R^3$ may join to each other to form a 5- or 7-membered ring; $B^1$ represents $-CR^3=$ or a nitrogen atom; $B^2$ represents $-CR^5=$ or a nitrogen atom; $R^4$ and $R^5$ each independently represents a hydrogen atom or a substituent, $G^1$ and $G^2$ each independently represents a hydrogen atom or a substituent.

11. A colored curable composition according to claim 10, wherein, in formula (2), $B^1$ is $-CR^4=$ and $B^2$ is $-CR^5=$ or a nitrogen atom.

12. A colored curable composition according to claim 10, wherein, in formula (2): $R^4$ is an aliphatic group, an aliphatic oxy group, an aromatic oxy group, an aliphatic amino group, or an aryl amino group; $R^5$ is a hydrogen atom, an aliphatic group, or a cyano group.

13. A colored curable composition according to claim 10, wherein, in formula (2), at least one of $G^1$ and $G^2$ is an aliphatic amino group or an aryl amino group.

14. A colored curable composition according to claim 1, wherein the colorless monomer is methyl acrylate, methacrylic acid, crotonic acid, acrylic acid, styrene, t-butyl acryl amide, acryl amide, potassium styrene sulfinate, sodium styrene sulfonate, sodium 2-acrylamide-2-methyl propane sulfonate, or sodium 3-acryloyloxy propane sulfonate.

15. A colored curable composition according to claim 1, wherein the molar ratio of the dye monomer represented by formula (P) to the colorless monomer in the copolymer is 4.5:1 to 1:10.

16. A colored curable composition according to claim 1, wherein in the polymer dye the proportion of the dye portion is 30 to 90% by mass.

17. A colored curable composition according to claim 1, wherein the polymer dye has a hydrophilic group, and the hydrophilic group is a portion of an ethyleneoxy chain, a propyleneoxy chain, a hydroxyl group, a carboxylic acid, a sulfonic acid or a salt thereof.

18. A colored curable composition according to claim 1, which further contains a radiation sensitive compound and a polymerizable monomer.

* * * * *